United States Patent [19]
Akisada et al.

[11] Patent Number: 5,687,307
[45] Date of Patent: Nov. 11, 1997

[54] COMPUTER GRAPHIC ANIMATION IN WHICH TEXTURE ANIMATION IS INDEPENDENTLY PERFORMED ON A PLURALITY OF OBJECTS IN THREE-DIMENSIONAL SPACE

[75] Inventors: Hirokazu Akisada, Tokyo; Shigeki Yamada, Yokohama, both of Japan

[73] Assignee: Canon Kabushiki Kaisha, Tokyo, Japan

[21] Appl. No.: 307,152

[22] Filed: Sep. 16, 1994

[30] Foreign Application Priority Data

| Sep. 21, 1993 | [JP] | Japan | 5-234700 |
| Oct. 13, 1993 | [JP] | Japan | 5-255802 |
| Dec. 28, 1993 | [JP] | Japan | 5-337383 |
| Sep. 13, 1994 | [JP] | Japan | 6-218912 |

[51] Int. Cl.$^6$ .................................. G06F 3/14
[52] U.S. Cl. ........................ 395/137; 395/119
[58] Field of Search .................. 395/119, 120, 395/128, 141, 136, 137, 138

[56] References Cited

U.S. PATENT DOCUMENTS

| 4,956,704 | 9/1990 | Yamada | 358/80 |
| 5,038,223 | 8/1991 | Yamada | 358/445 |
| 5,283,841 | 2/1994 | Yamada | 382/54 |
| 5,467,446 | 11/1995 | Mikkelsen et al. | 395/137 X |
| 5,524,188 | 6/1996 | Halpern | 395/137 X |
| 5,557,714 | 9/1996 | Lines et al. | 395/137 |

*Primary Examiner*—Phu K. Nguyen
*Assistant Examiner*—Cliff N. Vo
*Attorney, Agent, or Firm*—Fitzpatric, Cella, Harper & Scinto

[57] ABSTRACT

An image processing apparatus which enables three-dimensional modeling and a full variety of computer graphic animation. For this purpose, the apparatus inputs three-dimensional data of a plurality of objects, and independently sets texture animation state values and change amounts for the respective objects. As texture animation is started, display of each object changes in a real-time manner from the initial display state in accordance with a change amount.

25 Claims, 22 Drawing Sheets

SCREEN (UVN COORDINATE SYSTEM)

DISPLAY IMAGE (DEVICE COORDINATE SYSTEM)

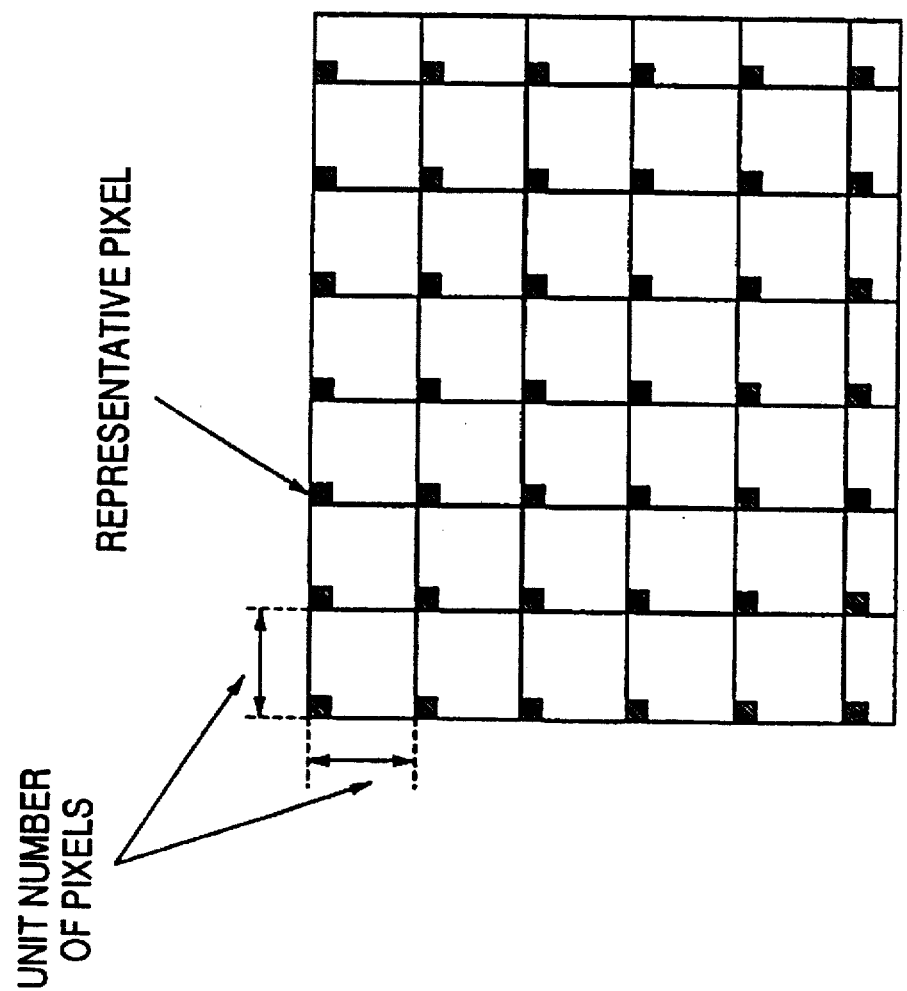

SCREEN

SCREEN

FIG. 22
TEXTURE COORDINATE SYSTEM
(s, t)
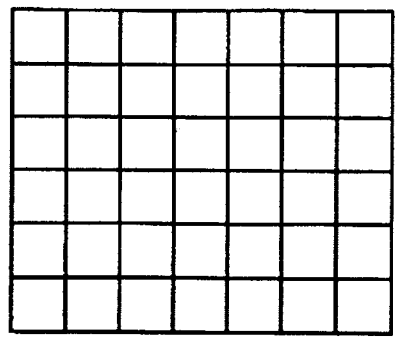
↓
OBJECT SURFACE
COORDINATE SYSTEM
(x, y)
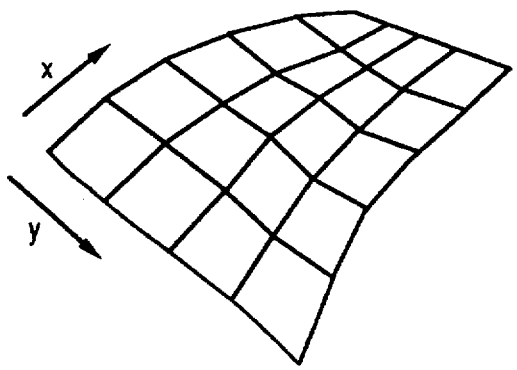
↓
WORLD COORDINATE SYSTEM
(xw, yw, zw)
↓
SCREEN COORDINATE SYSTEM
(u, v)
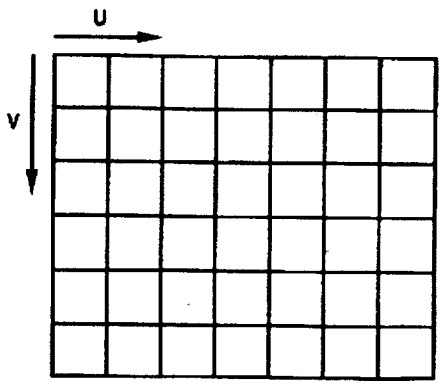

COMPUTER GRAPHIC ANIMATION IN WHICH TEXTURE ANIMATION IS INDEPENDENTLY PERFORMED ON A PLURALITY OF OBJECTS IN THREE-DIMENSIONAL SPACE

BACKGROUND OF THE INVENTION

The present invention relates to an image processing apparatus and method for computer graphics and, more particularly, to an image processing apparatus and method for computer graphic (CG) animation, in which texture animation is independently performed on a plurality of objects in three-dimensional space.

Conventional computer graphic methods, especially three-dimensional graphic methods forming three-dimensional object images mainly includes "modeling" and "rendering".

Modeling is generating data for an object to be represented as an image, such as form, color and surface characteristic, and storing the generated data in a computer. For example, an image of a human face is generated by inputting data on the external shape, data on the shape of each part of the face and data on light reflectivity, etc. in a format to be used in the following "rendering". The collection of this data is called the model of the object.

Rendering is forming an image in accordance with "how it looks" from a given position. Specifically, after the object model has been prepared, how to represent the object as it appears from a certain point of view is studied and the image viewed from that point of view is formed. For the purpose of rendering, conditions such as a view position (viewpoint) and illumination must be considered as well as the model. Rendering includes:

Coordinate conversion

Hidden surface (occluded region) elimination

Shading

A process for obtaining reality

Coordinate conversion is the conversion of various coordinate values representing the model into coordinate values on a display screen by calculating the coordinate values seen from a viewpoint. Next, "hidden surface (occluded region) elimination" is performed by determining what portion is seen, and what portion is not seen from the current viewpoint. Typical hidden surface elimination algorithms include the Z buffer method and the scan line method. As the portions seen from the viewpoint is determined by the hidden surface elimination, "Shading" is performed by determining the color and brightness of the respective portions from the viewpoint based on the illumination condition, and applying a thus determined color to each pixel. Normally, the process for reality is made at the final stage of the rendering. The picture (image) obtained through use of view conversion, hidden surface elimination and shading, is different from a real object, is because the three-dimensional image formation erroneously produces an ideal flat surface or a completely smooth curved surface represented by an expression, further, a constant color on each surface is shown. "Texture mapping" is a typical method that avoids such unnaturalness, and obtains an image closer to resembling a real image. Texture mapping is the application of a prepared two-dimensional pattern to the surface of an object model in three-dimensional space, thus changes the initial monotonous surface of the object to a complicated surface. For example, a texture-mapped model having a simple shape of a rectangular parallelepiped looks like a metal or stone material.

Computer graphic animation where pictures obtained from the aforementioned methods have motion is produced by the following two methods.

The first method changes illumination and viewpoint (position/direction/angle of viewpoint) conditions of an object model in three-dimensional space and the shape and color of the object model by a small amount and rendering at each change, to obtain a series of images. The images (alternatively, each rendered image) are frame-by-frame recorded (frame recording) using a recording device such as a video recorder. After all the images have been recorded, the recorded images are reproduced using a reproducing device. In this method, as the time for rendering can be prolonged within an allowable range (depending upon rendering of one image and the entire period for reproduction of the animation), a plurality of objects having complicated shapes may be arranged on the screen image, or rendering that requires a long-time calculation such as "ray tracing" may be used to produce a high-quality image. For example, CG images appear in TV commercial films, and science fiction movies are made, based on this method.

The second method produces a CG animation by quickly repeating two processings: rendering while changing the above-mentioned illumination conditions, viewpoint conditions and the shape and color of the object model, and displaying the rendered image. This is commonly called "real-time CG animation" that enables interactive (dialog) processing by directly reflecting instruction from a user on rendering to attain real-time control of the motion of the CG animation. However, this control to a great extent, depends upon computer performance. Some cases limit the number of displayable objects, or allow only simple and high-speed rendering, thus the quality of the obtained images are degraded in comparison with images obtained by the former method. Typical images obtained by this method include images for a flight simulator for training pilots, and images for a racing game in game arcades.

Conventionally, texture mapping on objects within rendered images in the conventional CG devices merely imitates the material appearance or feeling of real objects. Visual texture change in animation is only a subtle color change in accordance with changes of viewpoint and illumination conditions. An artistic CG animation having texture animation with dynamic change of the shape and color of texture has not been realized.

Further, in a case where the number of input texture images is small, those limited texture images are mapped on a plurality of objects, thus the obtained CG animation image becomes monotonous and uninteresting.

In addition, a computer graphic device "has not been provided" which can change textures to be mapped on respective objects and texture animations of the textures in the process of CG animation.

SUMMARY OF THE INVENTION

The present invention has been made in consideration of the above situation, and has as its object to provide an image processing apparatus and method which enables a CG animation having artistic effects which cannot be obtained by conventional CG devices and methods. Specifically, texture animation state values are assigned to each of a plurality of objects in three-dimensional space, and the texture animation state values are changed as animation progresses, thus texture animation is independently performed for each object.

Further, another object of the present invention is to provide an image processing apparatus and method which assigns a unique texture animation state value to the respective objects in three-dimensional space, and changes the texture animation state values in the process of generating a plurality of images which form a CG animation. The image processing apparatus performs:

(1) Changing over textures assigned to the respective objects and texture animations performed on the textures into other textures and other texture animations.

(2) Changing the motion of the plurality of different objects even when the same animation is performed on the objects, by changing texture animation variables within the respective texture animation state values.

Thus, the image processing apparatus enables a CG animation having artistic effects, e.g., dynamic changes of the textures mapped on respective objects, which cannot be obtained by conventional CG devices and methods.

Accordingly, the image processing apparatus according to the present invention enables a CG animation having a variety of textures with even a small number of texture images, by preparing a plurality of texture animations.

A further object of the present invention is to provide a modeling method and apparatus which provides an excellent user interface for modeling.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is an explanatory view of a mosaic processing;

FIG. 22 is an explanatory view showing respective coordinate conversions in the fifth embodiment.

DETAILED DESCRIPTION OF THE PREFERRED EMBODIMENT(S)

Preferred embodiments of the present invention will be described in detail in accordance with the accompanying drawings.

[First Embodiment]

First, to clarify the feature of the present invention, the flow of processings according to the first embodiment, a three-dimensional object modeling, an image rendering and displaying of a formed image from the rendering, is described below.

<Modeling>

Figure 2:
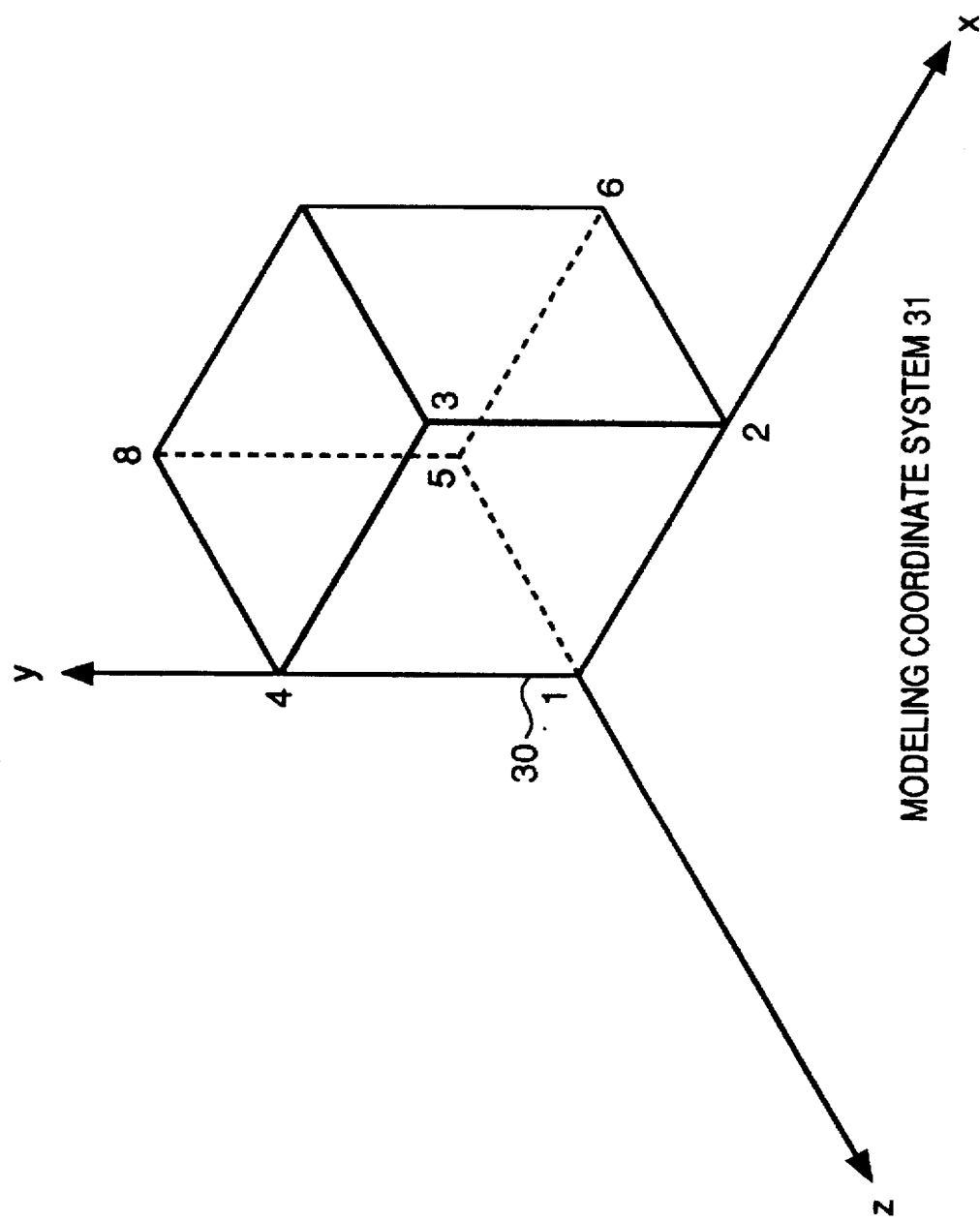
FIG. 2 illustrates a three-dimensional object in a modeling coordinate system.

The three-dimensional object modeling is performed by inputting three-dimensional shape data of an object in a modeling coordinate system, using a coordinate system for defining and manipulating the object shape. For example, if modeling is performed on an object as shown in FIG. 2, a modeling coordinate system having one of the vertexes as an original point is prepared. In this coordinate system, eight vertexes coordinate data (x,y,z coordinates) are determined as follows:

TABLE 1

| <Coordinate Data> (vertex numbers are given from the top) | | | |
|---|---|---|---|
| 8 | | | ... Number of all vertexes |
| 0.0 | 0.0 | 0.0 | ... (x,y,z) coordinates of each vertex |
| 1.0 | 0.0 | 0.0 | |
| 1.0 | 1.0 | 0.0 | |
| 0.0 | 1.0 | 0.0 | |
| 0.0 | 0.0 | −1.0 | |
| 1.0 | 0.0 | −1.0 | |
| 1.0 | 1.0 | −1.0 | |
| 0.0 | 1.0 | −1.0 | |

As shown in Table 1, the number of vertexes and the respective vertex coordinate data (vertexes 1 to 8) are inputted.

Next, surface loop data, i.e., data for connecting points of the object to form a surface, are determined as follows:

TABLE 2

| <Surface Loop Data> | | | | |
|---|---|---|---|---|
| 6 | | | | ... Number of surfaces of object |
| 4 | | | | ... Number of vertexes forming 1st surface loop |
| 1 | 2 | 3 | 4 | ... Vertex numbers of 1st surface |

TABLE 2-continued

| 4 | | | | ... Number of vertexes forming 2nd surface loop |
|---|---|---|---|---|
| 5 | 6 | 7 | 8 | |
| 4 | | | | |
| 4 | 3 | 7 | 8 | . |
| 4 | | | | . |
| 1 | 5 | 8 | 4 | . |
| 4 | | | | |
| 1 | 2 | 6 | 5 | |
| 4 | | | | ... Number of vertexes forming 6th surface loop |
| 2 | 6 | 7 | 3 | ... Vertex numbers of 6th surface |

Thus obtained set of coordinate data and surface loop data become the modeling data of the object in FIG. 2.

<Rendering>

Projection Conversion

The three-dimensional modeling of the object is followed by projection conversion, which corresponds to, in photography, selection of lens (focal distance= magnification), determination of place (viewpoint) and direction of camera (view axis).

Figure 3:
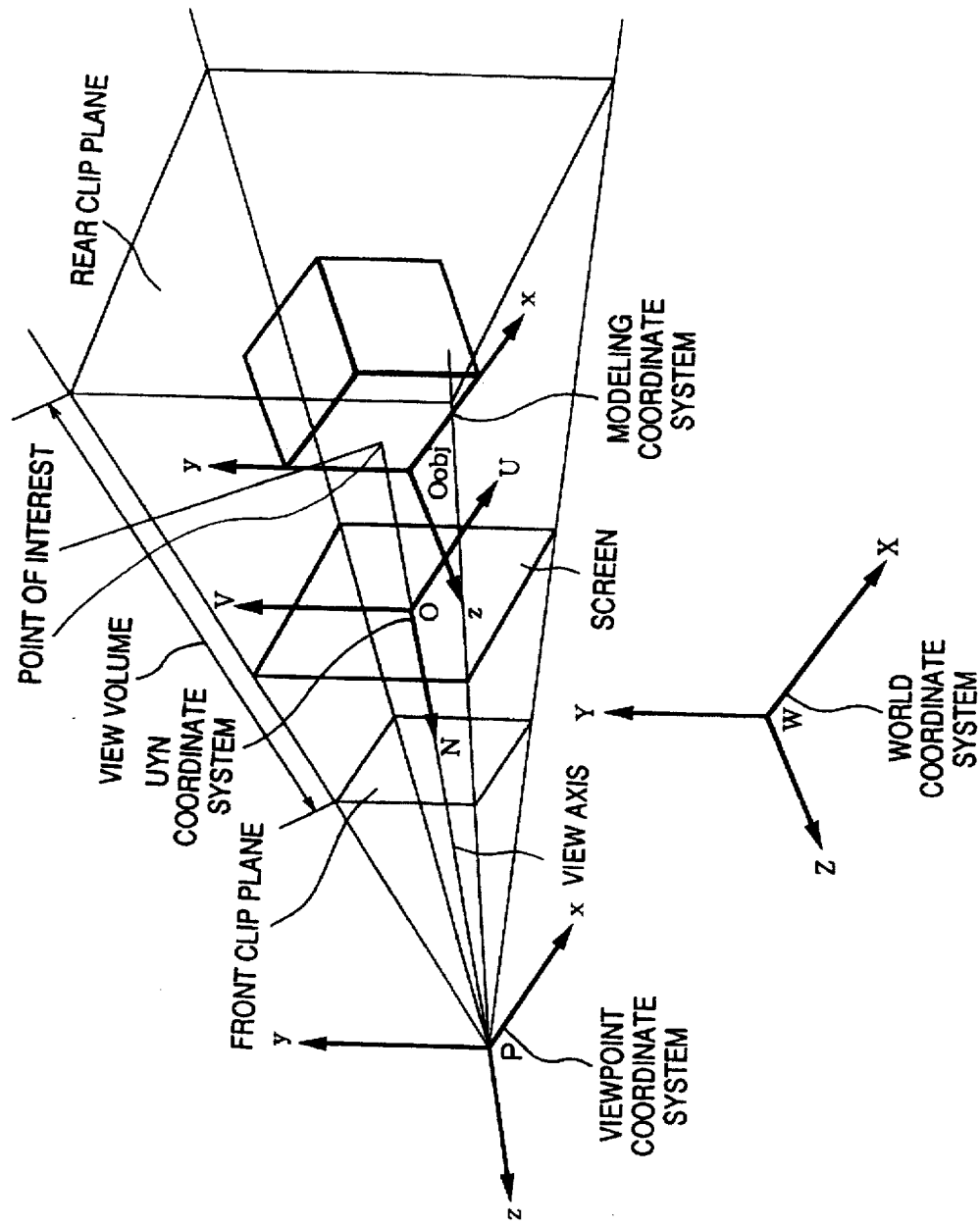
FIG. 3 illustrates four coordinate systems for projection conversion.

FIG. 3 shows four coordinate systems for projection conversion. First, the object shape data defined in the modeling coordinate system is converted into data in a world coordinate system (coordinate system in the model to represent the shape of the object). Next, a selected camera is turned toward various directions, as viewing conversion (view conversion), so that the object can be captured by the camera. At this time, the object data represented by the world coordinate system is converted into data in a viewpoint coordinate system. For this conversion, a screen (view window) is set in the world coordinate system, and the set screen becomes the final projection screen. A coordinate for defining this screen is called UVN coordinate system (screen coordinate system). Further, to avoid unnecessary calculation due to depicting all things in front of the viewpoint, a depicting range is determined (the depicting range is called view volume (view space), and this operation is called clipping).

Figure 4:
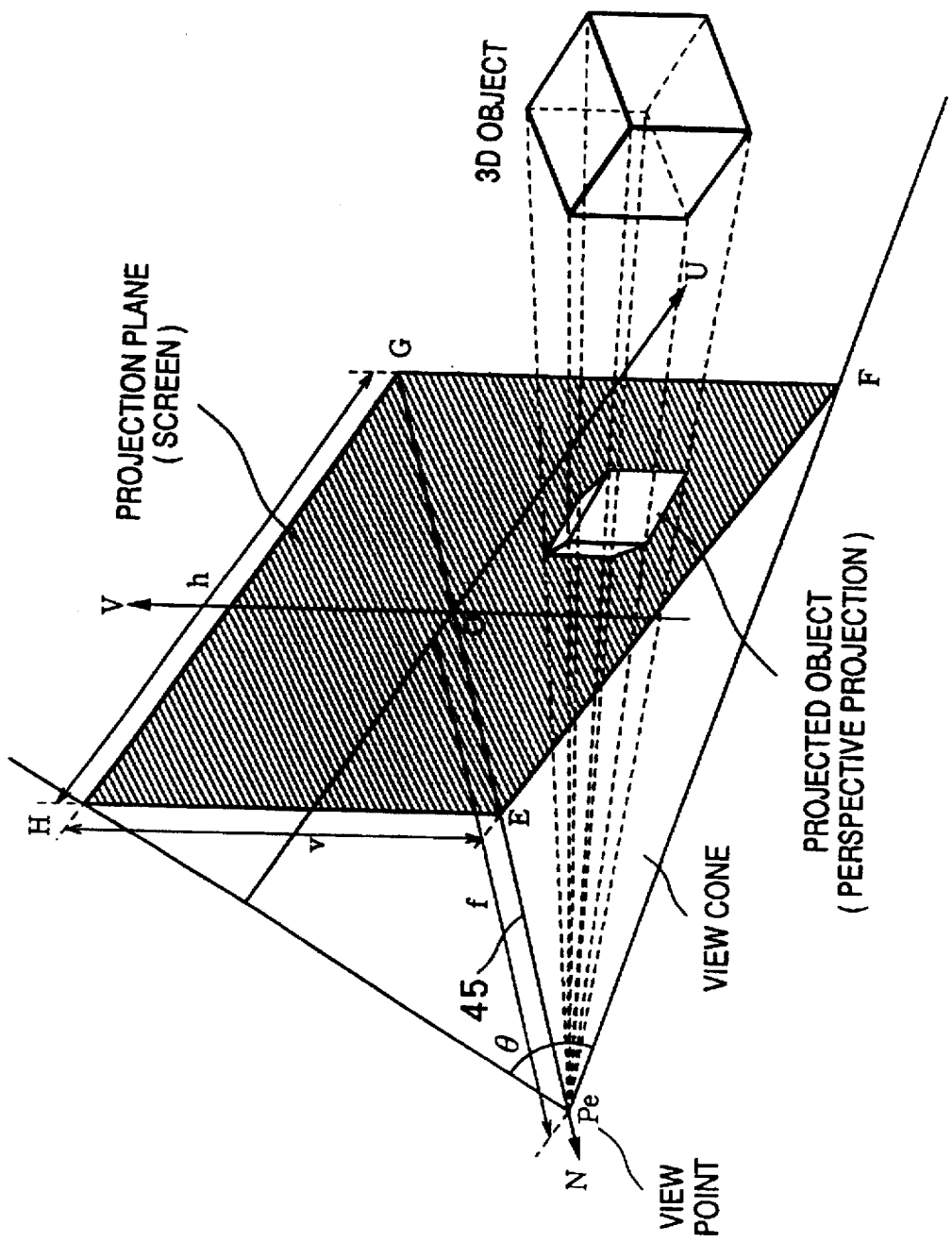
FIG. 4 is an explanatory view of the projection conversion.

FIG. 4 shows projection conversion. First, a viewpoint as a point of interest in the projection conversion is set in space, and a view axis (semi-straight line from the viewpoint toward the direction which a viewer is looking at) and a view angle (picture angle) $\theta$ are set. A plane crossing the view axis and at a position away from the viewpoint by a distant f (view distance) is a projection plane (screen). The shape of a portion of the projection plane crossing a view cone (cone having the view axis as the central axis) is a circle. As shown in FIG. 4, within the projection plane, a rectangular area having horizontal sides of length h and vertical sides of length v is set as a screen.

The lengths h and v are obtained from the following equation. Assuming that the ratio of h to v is the same as the ratio of image length to image width, as a line OE is a radius of the aforementioned circle, $$\angle OPE=\theta/2 \qquad (1)$$

As a result, $$\text{len}(OE)=f*\tan(\theta/2) \qquad (2)$$

A point O is the central point of a line EG, therefore, equation (1) is used, $$\text{len}(EG)=2*\text{len}(OE)=2*f*\tan(\theta/2) \qquad (3)$$

Next, assuming that the number of pixels in horizontal and vertical directions are a and b, as the ratio of a to b is the same as the h to v ratio, $$a:b=h:v \qquad (4)$$

From the Pythagorean theorem, $$h*h+v*v=\text{len}(EG)*\text{len}(EG) \qquad (5)$$

From equations (3) to (5), $$h=2*f*\tan(\theta/2)/\text{sqrt}(1+(a/b)*(a/b)) \qquad (6)$$

$$v=2*f*\tan(\theta/2)/\text{sqrt}(1+(b/a)*(b/a)) \qquad (7)$$

len(AB): a function for obtaining the length of a line AB
sqrt(x): a function for obtaining the square root of x View conversion is made by moving the screen in various directions. After view conversion has been completed, an intersection of the viewpoint and the projection plane is obtained with respect to the points of the three-dimensional object in the space. Then, a projection image is formed on the screen with the obtained intersections (in this example, the distance between the viewpoint and the projection plane is limited). In this manner, the data represented by the viewpoint coordinate system has been converted into data in the UVN coordinate system.

The figure represented by the UVN coordinate system is converted into a final device coordinate system and displayed on a display unit. Note that the device coordinate system is used for representing pixels or dot positions of image, and this coordinate system corresponds to the coordinate system of a display unit.

Actually, the above-described coordinate conversion is performed as expressed by the following equations.

That is, in the world coordinate system having X-Z plane as a horizontal plane and y-axis as a vertical axis to the horizontal plane, the position and direction of a viewpoint and an object to be represented are determined. Note that the z-axis in the viewpoint coordinate system is set to be parallel to the view axis, and the x-axis is set to be parallel to U-axis of the UVN coordinate system. Assuming that in the world coordinate system, an arbitrary point P is (X,Y,Z), the coordinates of the viewpoint is (Xe,Ye,Ze), an azimuth angle (horizontal angle) is $\alpha$, an elevation angle (vertical angle) is $\beta$, and in the viewpoint coordinate system, the coordinates of the point P is (x,y,z), the relation between these coordinate systems is:

$$\begin{pmatrix} x \\ y \\ z \end{pmatrix} = T_\beta T_\alpha \begin{pmatrix} X - Xe \\ Y - Ye \\ Z - Ze \end{pmatrix}$$

$$T_\alpha = \begin{pmatrix} \cos\alpha & 0 & \sin\alpha \\ 0 & 1 & 0 \\ -\sin\alpha & 0 & \cos\alpha \end{pmatrix}$$

$$T_\beta = \begin{pmatrix} 1 & 0 & 0 \\ 0 & \cos\beta & -\sin\beta \\ 0 & \sin\beta & \cos\beta \end{pmatrix}$$

Further, assuming that the projection plane on which a three-dimensional image is projected is vertical to the x-axis of the viewpoint coordinate system and that the view distance is f as described above, the coordinates (x', y') of point P' obtained from projection of the point P in the space on the U-V plane as a projection plane is:

$$x'=f \cdot (x/z)$$

$$y'=f \cdot (y/z)$$

Image Formation and Display

Figure 5A:
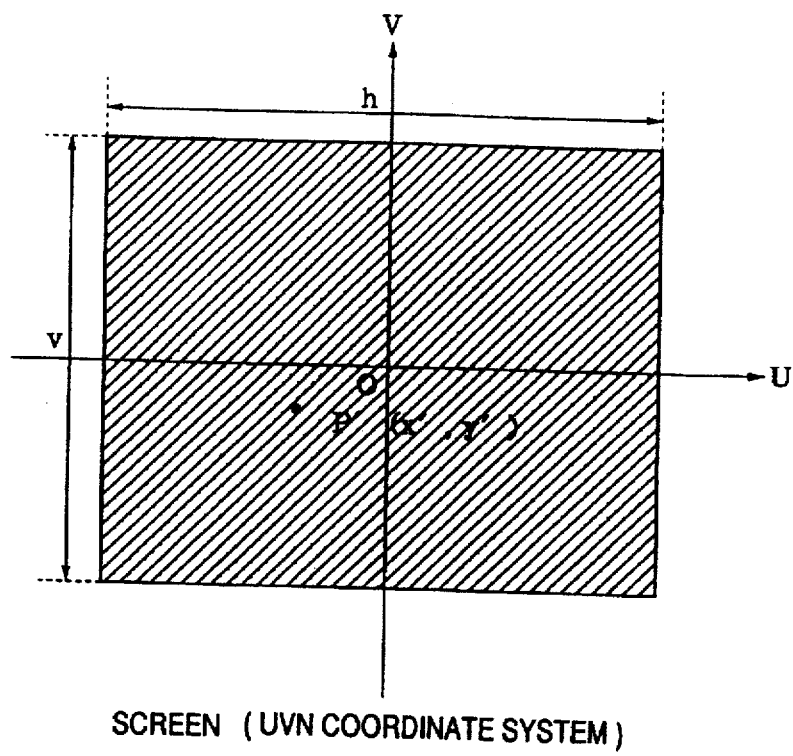
FIG. 5A illustrates a screen (UVN coordinate system) according to the first embodiment.
Figure 5B:
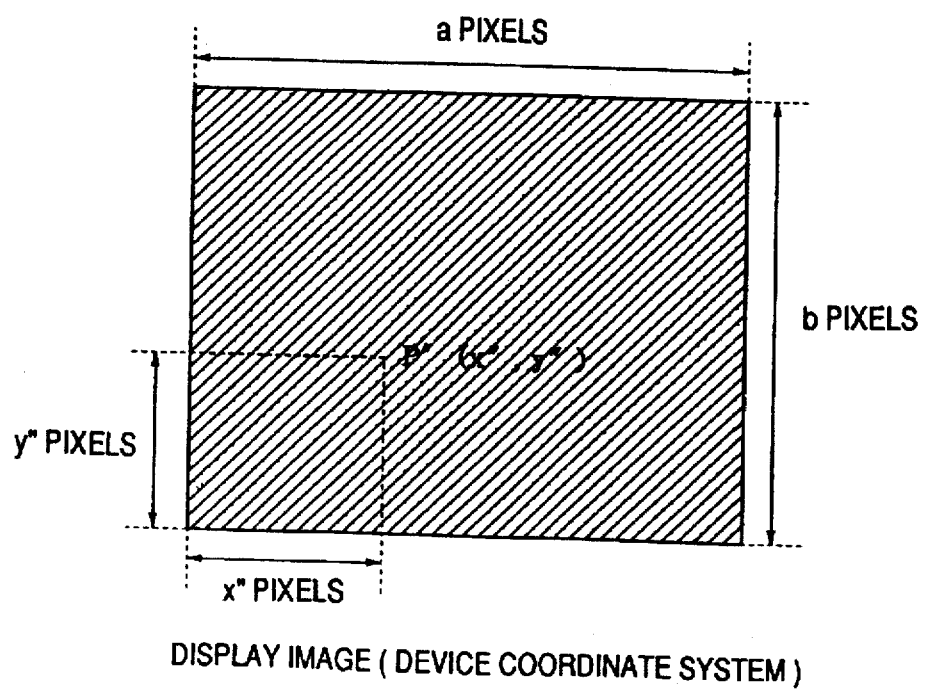
FIG. 5B illustrates a display image (device coordinate system) according to the first embodiment.

Finally, the screen area (FIG. 5A) within the U-V plane is converted into a pixel array in a display image (device coordinate system). At this time, assuming that the coordinates of a point P" corresponding to the point P' within the screen is (x", y"), the coordinate values x" and y" are:

$$x''=a \cdot x'/h+a/2$$

$$y''=b \cdot y'/v+b/2$$

Note that h and v respectively represent the screen width and the screen height, and a and b respectively represent the number of pixels in the horizontal and vertical directions of the display image (device coordinate system).

Using this coordinate conversion, points on the screen (sample points) are set corresponding to the pixels within a final output image. Specifically, the sample points included in the object are found, and the corresponding pixels in the display image are given with texture color values. In this manner, the object converted into data in the UVN coordinate system is converted into a pixel array of a final two-dimensional image. Generally, in a case where a plurality of objects are represented in this method, a method for eliminating a hidden surface (Hidden surface (occluded region) elimination method) may be employed. In this method, an area for storing width information of each pixel on the display device is provided, and the widths of the plurality of objects are compared using this area to eliminate a hidden surface.

<CG Animation Processing>

A CG (computer graphics) animation processing according to the present embodiment will be described in detail with reference to the attached drawings.

Figure 1:
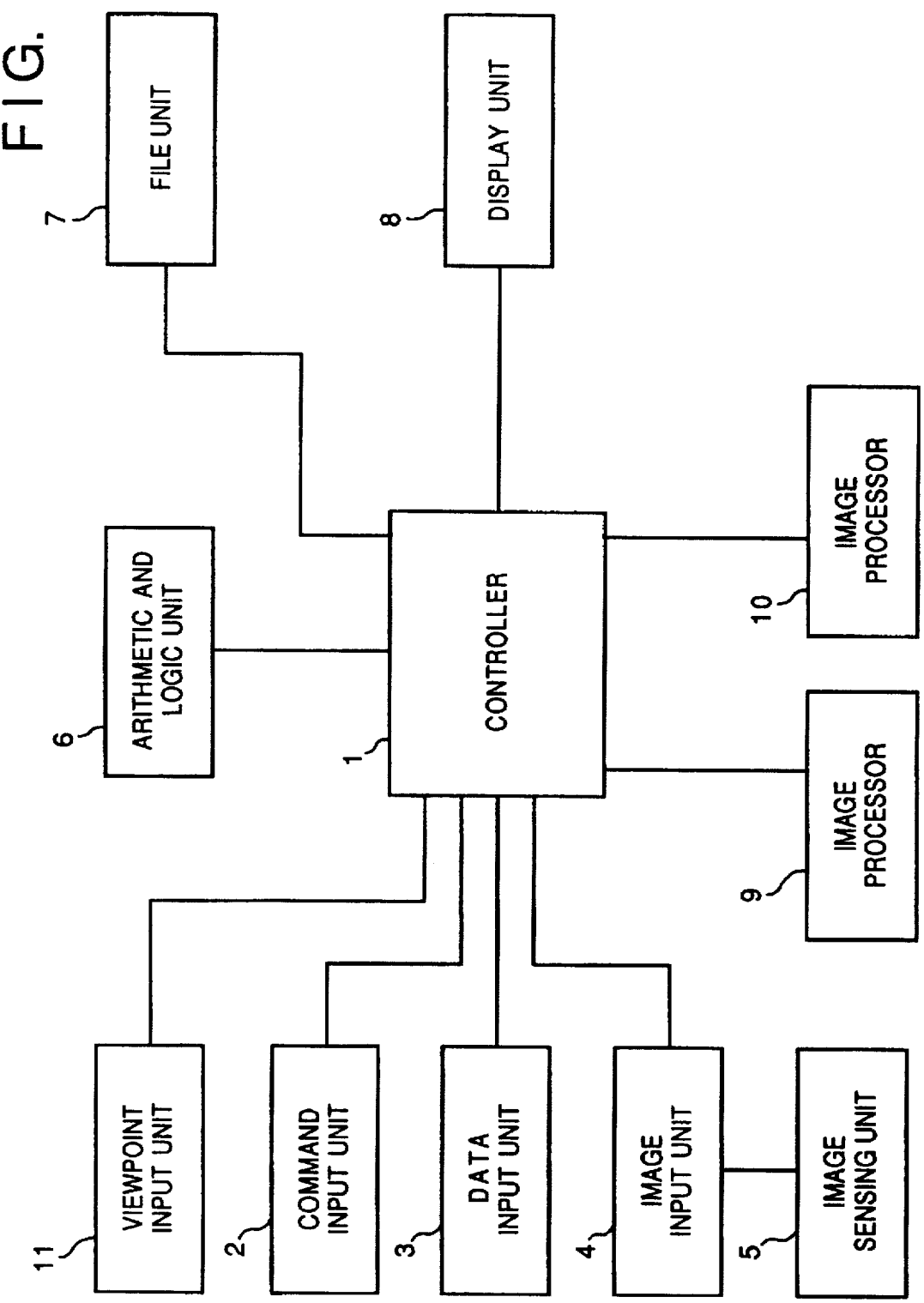
FIG. 1 is a block diagram showing the configuration of a computer graphic apparatus according to a first embodiment of the present invention.

FIG. 1 shows the configuration of a computer graphic apparatus according to the first embodiment of the present invention.

In FIG. 1, reference numeral 2 denotes a command input unit for inputting instructions such as start the CG animation processing, selection of texture to be mapped on an object and selection of texture animation, and change of texture animation state values during the CG animation processing. The command input unit 2 is, e.g., a keyboard.

Numeral 3 denotes a data input unit for inputting object modeling data, viewpoint conditions and the like. The data input unit 3 is, e.g., a mouse.

Numeral 4 denotes an image input unit for inputting texture images. The image input unit 4 is, e.g., a drum scanner.

Numeral 5 denotes an image sensing unit for inputting texture images. The image sensing unit is, e.g., a camera.

Numeral 6 denotes an arithmetic and logic unit (ALU) for updating various variables and rendering modeling data with the texture images and performing view conversion, thus forming a display image.

Numeral 7 denotes a file unit (hard disk drive, magneto-optical disk drive etc.) for storing various data such as modeling data, viewpoint condition data and animation variable data.

Numeral 8 denotes a display unit for displaying the display image formed by the rendering processing. The display unit 8 is, e.g., a CRT monitor.

Numeral 9 denotes an image processor for generating a mosaic-processed image, to be described later, from a two-dimensional image.

Numeral 10 denotes an image processor for generating a color-converted image, to be described later, from a two-dimensional image.

Figure 6A:
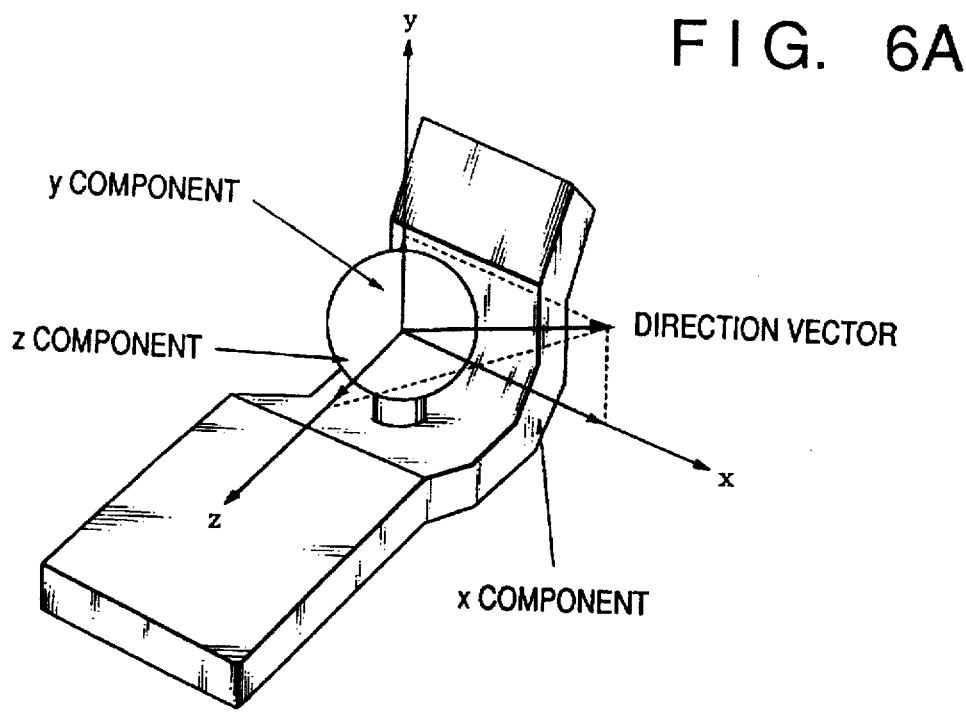
FIGS. 6A and 6B are perspective views showing the construction of a space ball.
Figure 6B:
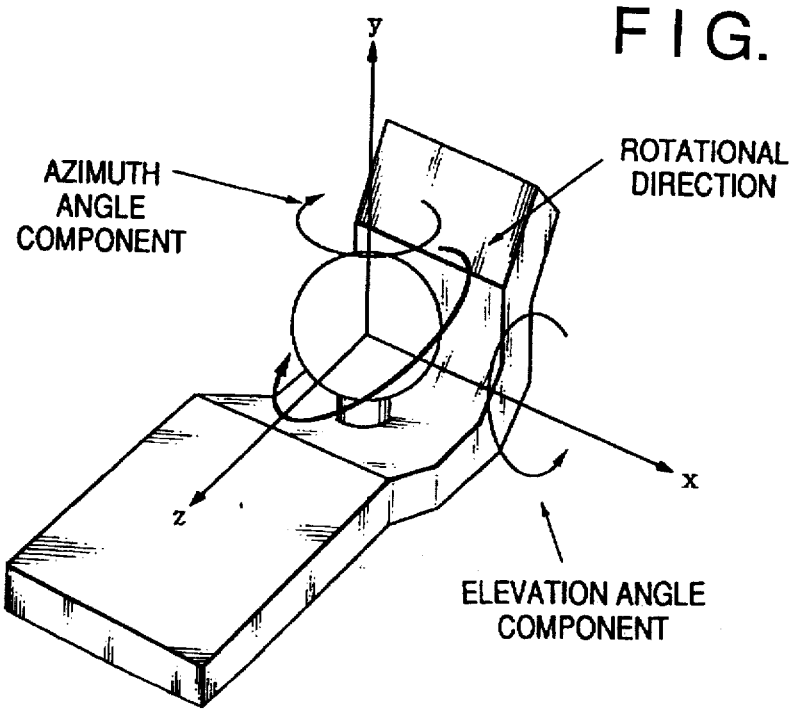

Numeral 11 denotes a viewpoint input unit for inputting movement of a viewpoint position and change of azimuth angle and elevation angle of the viewpoint. The viewpoint input unit is, e.g., a space ball as shown in FIG. 6A. The space ball comprises a ball member which is rotated by a small amount, and it detects the movement of the ball member in an arbitrary direction and the rotation of the ball member about an arbitrary axis. In this embodiment, as shown in FIG. 6A, when the central point of the ball moves in a given direction, the space ball outputs the respective movement components Dx, Dy, Dz of the movement vectors X,Y,Z. If the ball rotates with an axis as the rotation center as shown in FIG. 6B, the space ball outputs the respective rotation components $D\alpha$, $D\beta$ of the azimuth angle and elevation angle.

Numeral 1 denotes a controller for controlling the command input unit 2, the data input unit 3, the image input unit 4, the image sensing unit 5, the ALU 6, the file unit 7, the display unit 8, and the image processors 9 and 10. The controller 1 has a memory (not shown) for loading an Operating System pre-stored in the file unit 7 and programs for processings to be described later with reference to FIGS. 9 and 10.

The operation in case of real-time CG animation of the computer graphic apparatus having the above construction, is described in accordance with data flow.

First, when a user presses a key on the command input unit 2, e.g., a keyboard, the CG animation processing starts. Next, the apparatus is set to waiting status until shape data is inputted. The user performs modeling of an object by inputting shape data of a plurality of objects using coordinate values in a system modeling coordinate system (the modeling coordinate system corresponds to the world coordinate system). Next, the initialization of viewpoint conditions (viewpoint coordinates, view angle (depicting angle), elevation angle, azimuth angle, view distance) is performed. In FIG. 1, the image input unit 4 A/D converts a texture image, e.g., a landscape image inputted by the image sensing unit 5, and inputs the converted image into the file unit 7. For convenience of explanation, red, green and blue data constructing each pixel is represented as R, G and B data. One pixel is represented by 8-bit data, i.e., data which can be represented at 256 levels (the highest luminance: 255, the lowest luminance: 0), however, this does not pose any limitation upon the present invention. In this embodiment, upon texture image input, the number of pixels in the horizontal and vertical directions are determined based on reading pitch designated by the controller 1. Next, the user selects texture animations, to be mapped on the plurality of objects respectively, from pre-registered texture animations, and inputs initial state values of the designated texture animations. Upon completion of the initialization of all the values, the apparatus goes into waiting status until a CG animation start instruction is inputted by the user. Then the CG animation starts by the CG animation start instruction, and whether or not any command from the user has been received is checked. If no command has been received, image rendering is performed in accordance with the current viewpoint conditions and the texture animation state values, and the rendered image is displayed. Note that even though the viewpoint conditions have not changed, the texture animations on the objects change in accordance with the initial state values (in accordance with state values indicative of texture animation speeds). If the user has instructed change of the viewpoint conditions or texture animation state values, the image rendering is performed in accordance with the changed conditions or values. Upon the command reception check, if a CG animation termination has been instructed, the CG animation ends. Note that in the rendering of this embodiment, the conventional shading processing has not been described, however, the present invention is not limited to this rendering.

Two image processings (mosaic processing and color conversion processing) according to the present embodiment will be described below.

As shown in FIG. 7, mosaic processing is performed by dividing an image into a plurality of square areas having a side of a predetermined number of pixels (unit number of pixels), and in each area, all the pixels are replaced by a color value of one pixel (a representative pixel: a top-left point within each square in FIG. 7). Note that the division is made with the top-left points as references, and an area where the number of pixels at the right end and the lower end is less than the unit number, i.e., a rectangular area, also have the color of its representative pixel.

Color conversion is performed by setting change amounts of RGB colors and adding (or subtracting) the change amounts from corresponding RGB color values of all the pixels in an image. Note that if a new value obtained from this addition (or subtraction) is less than "0", the new value is made "0", while if greater than "255", it is made "255". Assuming the color of the i-th pixel of an image composed of N pixels is $(R_i, G_i, B_i)$ ($i=1, \ldots, N$), and the respective RGB change amounts are SR, SG, SB, the color conversion processing is:

$$R_i \leftarrow R_i + SR$$
$$G_i \leftarrow G_i + SG (i=1, \ldots, N)$$
$$B_i \leftarrow B_i + SB$$

The above-described image processings are employed in the following CG animation processing.

Next, a texture mapping method according to the present embodiment is described.

Figure 8:
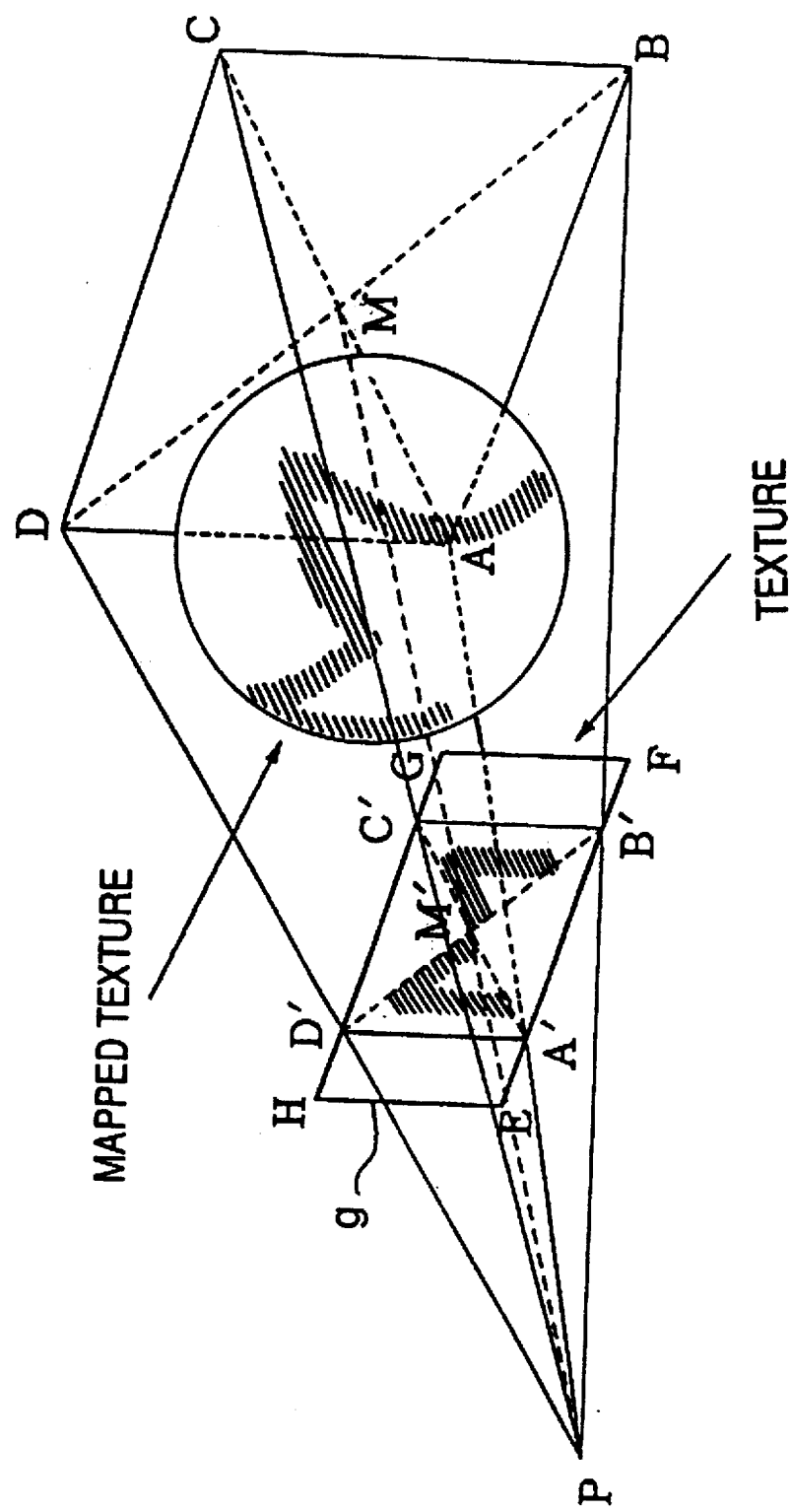
FIG. 8 illustrates texture mapping.
Figure 11A:
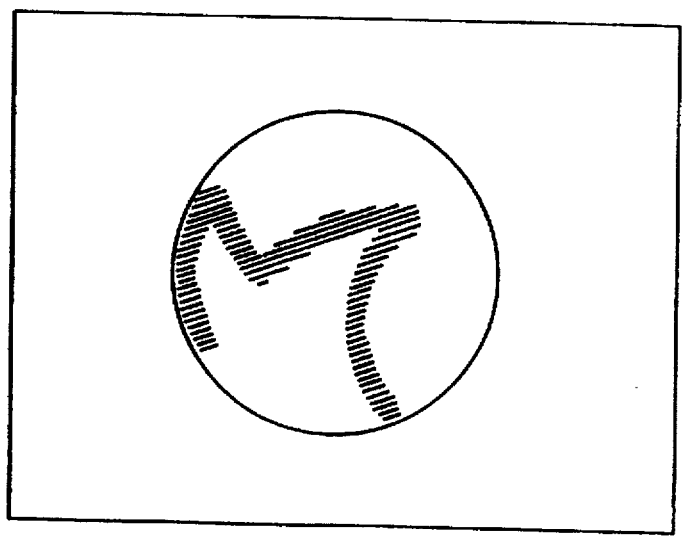
FIG. 11A illustrates a projection image of the object in FIG. 8 as seen from a viewpoint.
Figure 11B:
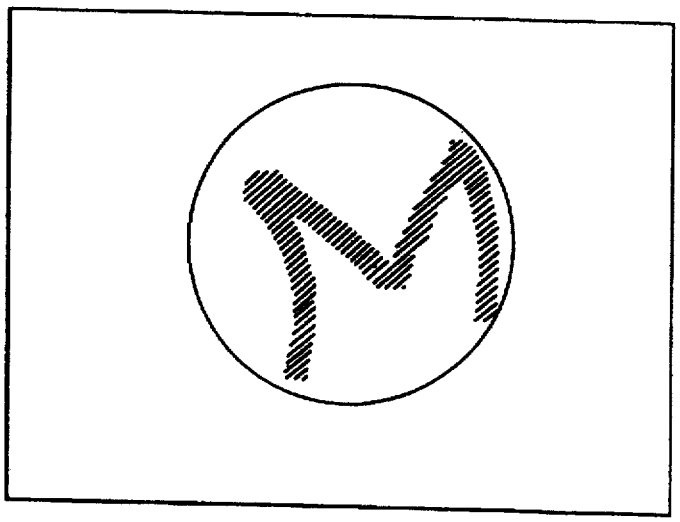
FIG. 11B illustrates a projection image of the object in FIG. 8 as seen from another viewpoint.

FIG. 8 shows perspective coordinating (projection coordinating) which is a typical texture mapping on an object in space. First, a projection central point P is set in the space, and a quadrangular pyramid P-ABCD having the point P as the summit is set (note that rectangle ABCD is oblong). A point M is an intersection of two diagonals of the rectangle ABCD. A plane g crossing a line PM is placed between the point P and the object, and within the quadrangular pyramid, a rectangular area cut out by the plane g is an area A'B'C'D'. An intersection of two diagonals of the rectangle A'B'C'D' is M'. An area representing a texture image is EFGH and an intersection of its two diagonals is M" (not shown). The intersection M' is set to be co-axial with the intersection M", and the texture EFGH is set so as to include the rectangle A'B'C'D'. In this state, projection from the point P is performed and a part of the texture is mapped on the object (in FIG. 8, a letter "M" of the texture is mapped on the surface of the object). As shown in FIG. 8, when a texture-mapped object is seen from one viewpoint, an image projected on a screen is as shown in FIG. 11A. On the other hand, an screen image of the object from another viewpoint is as shown in FIG. 11B.

It should be noted that for the sake of simplicity, an object in the following description has one flat surface, however, this does not pose any limitation upon the present invention.

The texture mapping as described above is employed in the following CG animation processing.

Figure 9:
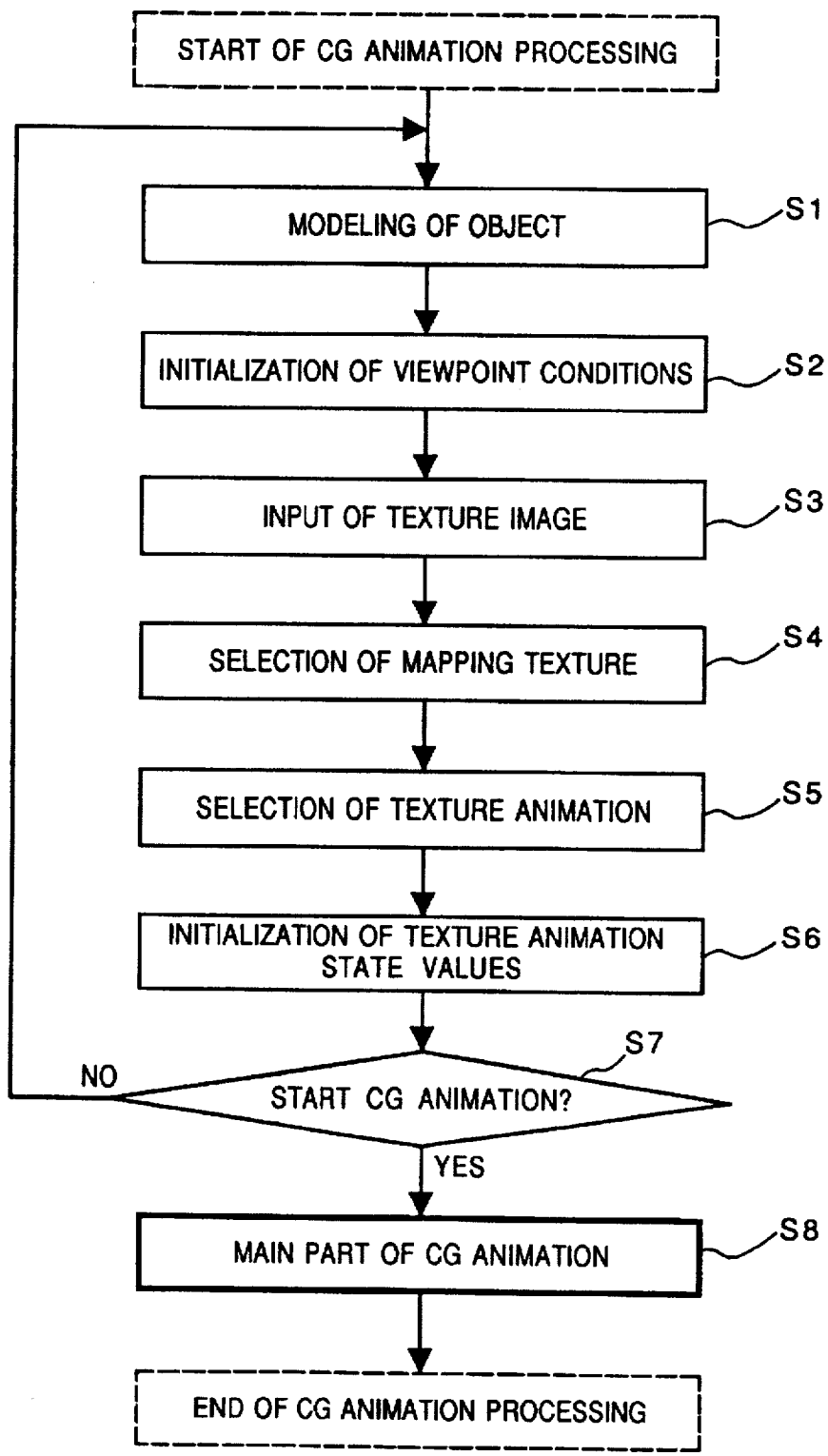
FIG. 9 is a flowchart showing a CG animation processing.

FIG. 9 is a flowchart showing the CG animation processing according to the present embodiment. The processing is described in accordance with data flow.

Step S1

1-1

A user inputs coordinate data of a rectangular figure. At this time, the controller 1 instructs to display a message

"INPUT FIGURE COORDINATE DATA"

on the display unit 8 to prompt the user to input data, and waits for the data input.

The user types from the keyboard,

"4 1.0 0.0 0.0 2.0 0.0 0.0 2.0 1.0 0.0 1.0 1.0 0.0"

and presses a return key. The numeric data is stored as a figure data (space becomes a delimiter) into the file unit 7. In these numeric values, the first numeral indicates the number of vertexes (rectangle in this case), and the respective sets of the second to fourth numerals, the fifth to seventh numerals, the eighth to tenth numerals, the eleventh to thirteenth numerals indicate the x,y,z coordinates of the respective vertexes. Upon inputting figure coordinates, if the initial numeral is "3", the figure has three vertexes. In this manner, the coordinates of a three-dimensional object are sequentially inputted.

1-2

Next, the user inputs surface loop data based on the input respective coordinate data. Specifically, the controller 1 instructs to display a message

"INPUT SURFACE LOOP DATA OF RECTANGLE"

on the display unit 8, and sets the command input unit 2 as a keyboard to command-input waiting status. Note that the "rectangle" in the message is from the input numeric value "4" indicating the number of vertexes. In response to the message, the user inputs

"1 4 1 2 3 4"

and presses the return key. The numeric data is stored as surface loop data of a rectangle into the file unit 7. In these numerals, the initial numeral indicates the number of surfaces constructing the object; the second numeral, the number of vertexes constructing a surface loop; and the third to sixth numerals, the vertex number array of the rectangle.

1-3

Next, the user inputs the coordinate data of another figure. That is, the controller 1 instructs to display the following message on the display unit 8 to prompt the user to input data from the command input unit 2.

"INPUT FIGURE COORDINATE DATA"

In response to the message, the user inputs using the keyboard, e.g.,

"3 −1.0 0.0 0.0 −1.0 1.0 0.0 −2.0 0.0 0.0"

and presses the return key. The numeric value data is stored as the coordinate data of the figure into the file unit 7. Also, the initial numeral indicates the number of vertexes, and the respective sets of the second to fourth numerals, the fifth to seventh numerals, the eighth to tenth numerals indicate the x,y,z coordinates of the respective vertexes. In this case, as the initial numeral "3" indicates a triangle, the numeric values are stored as triangular figure data.

1-4

Next, the user inputs surface loop data of a triangle. That is, the controller 1 instructs to display a message

"INPUT SURFACE LOOP DATA OF TRIANGLE"

on the display unit 8 and sets the command input unit 2 to command-input waiting status. In response to the message, the user types

"1 3 1 2 3"

and presses the return key. The numeric data is stored as the surface loop data of the rectangle into the file unit 7. In these numerals, the initial numeral indicates the number of surfaces constructing the object; the second numeral, the number of vertexes constructing a surface loop; and the third to fifth numerals, the vertex number array of the triangle. In this manner, the user can input data of all the objects to be processed, and the apparatus repeats the above operation for the respective objects. In this example, the objects are a rectangle and a triangle to simplify the explanation.

Step S2

Upon completion of data input regarding the objects, the user inputs initial values of viewpoint condition data.

For this input, the controller 1 instructs to display a message

"INPUT VIEWPOINT CONDITIONS"

on the display unit 8 to prompt the user to input data using the keyboard as the command input unit 2. The user types

"0.0 0.0 −10.0 2.0 0.0 0.0 5.0"

and presses the return key. The numeric data is stored as the initial values of viewpoint condition data into the file unit 7. In these numeric values, the first to third numerals indicate the coordinates of the viewpoint coordinates Pe(Xe,Ye,Ze), and the fourth to seventh numerals respectively indicate a view angle θ, an azimuth angle α, an elevation angle β and a view distance f. The length h and the width v of the screen are obtained from the above-described equations (5) and (6) using these values and the numbers a and b of pixels in the horizontal and vertical directions of a display image.

Step S3

Next, the user attaches, in this example, a photograph of a landscape and a photograph of a person, to a drum scanner as the image input unit 4, and inputs processing start from the command input unit 2 to the controller 1. The controller 1 receives the instruction and outputs a scan starting instruction to the image input unit 4. In accordance with the instruction, the input unit 4 scans the images attached to the drum, and outputs, e.g., 8-bit data quantized for the respective RGB colors. The controller 1 stores the two image data outputted from the image input unit 4 as texture images into the file unit 7.

At this time, on the assumption that the width and the length of the landscape picture are a1 and b1, those of the portrait is a2 and b2, and the reading pitch is p, the ALU 6 calculates the number of pixels in the horizontal direction and vertical directions (X1,Y1) of the landscape image and those of the portrait image (X2,Y2):

$X1 = a1/p$ $Y1 = b1/p$ $X2 = a2/p$ $Y2 = b2/p$ and stores thus-obtained values into the file unit 7.

Step S4

The controller 1 sets the command input unit 2 to command-input waiting status, and designates the texture images to be mapped on the objects as follows:

Rectangle→landscape texture

Triangle→portrait texture

Step S5

The controller 1 sets the command input unit 2 to command-input waiting status, and designates texture animations to be mapped on the objects as follows:

Rectangle→mosaic processing

Triangle→color conversion

Step S6

The controller 1 set the data input unit 3 to data-input waiting status. The user inputs texture animation state values of the texture animations performed on the respective objects as follows.

For the mosaic processing on the rectangular object, the user inputs texture animation values Unit number $N$ of pixels←5

Change speed $Sm$ of $N$←2

Increment/decrement direction $Dm$ of change of $N$←1

Minimum value $Nmin$ of $N$←1

Maximum value $Nmax$ of $N$←100 for initialization. Note that the increment/decrement direction of unit number of pixels for mosaic processing is "1" (increment) or "−1" (decrement). In this setting, the unit number N of mosaic pixels increases by one every period Sm (=2).

For the color conversion, the user inputs texture animation state values $R$ change speed $SR$←10

$R$ change increment/decrement direction $DR$←1

$G$ change speed $SG$←20

$G$ change increment/decrement direction $DG$←−1

$B$ change speed $SB$←30

$B$ change increment/decrement direction $DB$←−1 for initialization. Note that the respective color change increment/decrement direction is "1" (increment) or "−1" (decrement). The input values are stored in the file unit 7. In this setting, the respective color components R, G, B values change by DR, DB, DG every period SR, SG and SB.

Step S7

Next, the command input unit 2 is set to command-input waiting status by an instruction from the controller 1. In response to a message "START CG ANIMATION?" on the display unit 8, if the user inputs "YES", the process proceeds to the next step to start the CG animation, while if the user inputs "NO", the process returns to step S1 to repeat the above steps.

Step S8

The main part of the CG animation is performed by an instruction from the controller 1, and ends by a termination instruction also from the controller 1.

Next, the processing performed in step S8 as the main part of the CG animation is described below.

Figure 10:
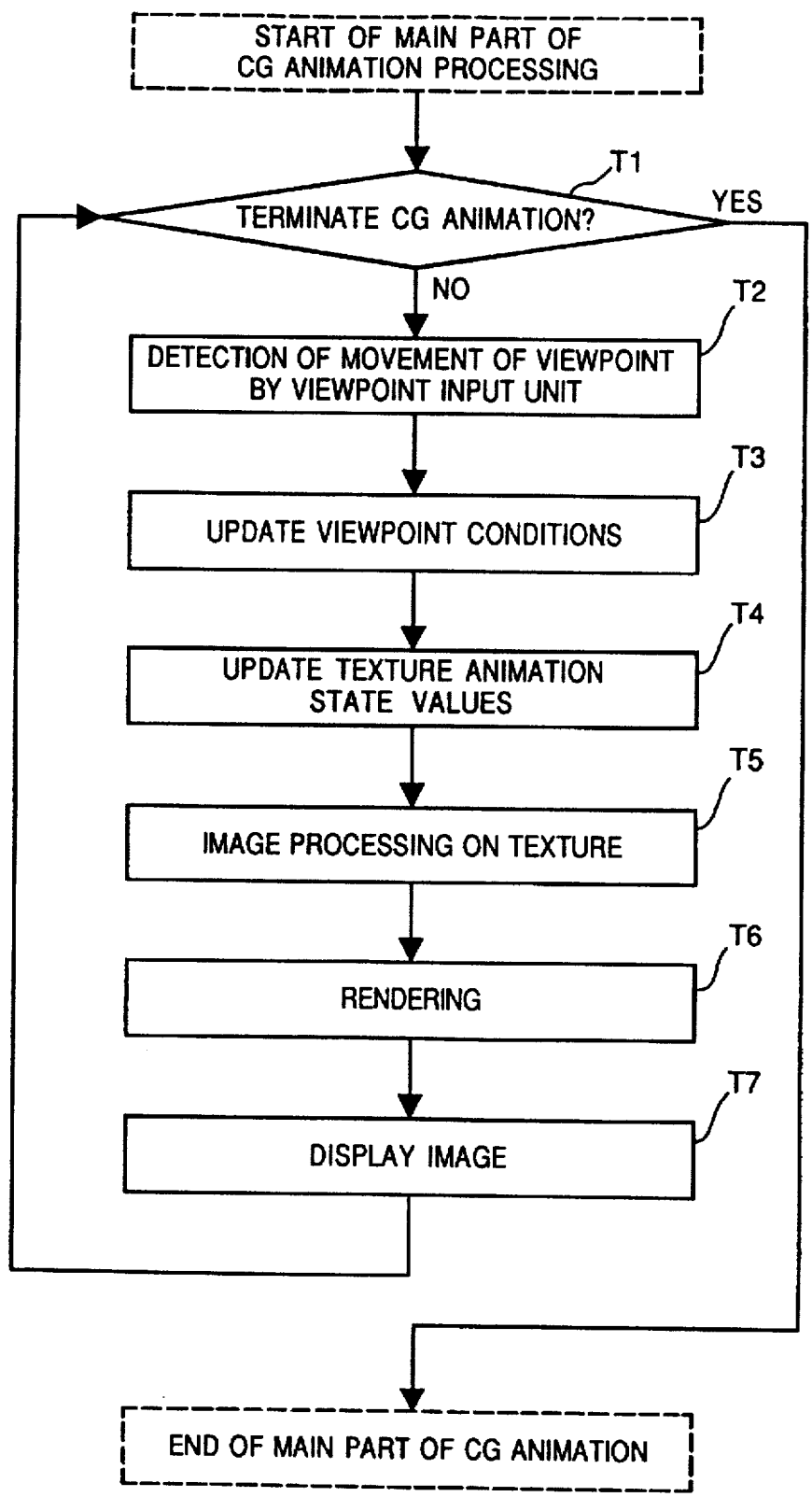
FIG. 10 is a flowchart showing a main part of the CG animation processing.

FIG. 10 is a flowchart showing the main part of the CG animation. The processing is described in detail in accordance with data flow.

Step T1

The command input unit 2 is set to command-input checking status by an instruction from the controller 1. If the user has inputted a CG animation termination instruction, the CG animation ends, while if no instruction have been inputted, the process proceeds to the next step.

Step T2

Initiated by an instruction from the controller 1, the viewpoint input unit 11 detects the space ball movement components Dx, Dy, Dz of the moving vectors X, Y, Z and the respective rotation components Dα, Dβ in horizontal and vertical directions, and stores the detected components in the file unit 7.

Step T3

Initiated by an instruction from the controller 1, the ALU 6 updates the viewpoint position Xe,Ye,Ze using the movement components Dx, Dy, Dz stored in the file unit 7 using the following expressions:

$Xe \leftarrow Xe+Dx$ $Ye \leftarrow Ye+Dy$ $Ze \leftarrow Ze+Dz$

Further, the ALU 6 updates the azimuth angle $\alpha$ and the elevation angle $\beta$ using the rotation components $D\alpha$ and $D\beta$ in the file unit 7 using the following expressions:

$\alpha \leftarrow \alpha + D\alpha$ $\beta \leftarrow \beta + D\beta$

Then the ALU 6 stores the updated $Xe,Ye,Ze,\alpha,\beta$ in the file unit 7.

Step T4

The ALU 6 updates the texture animation state values using the values Dx, Dy, Dx, $D\alpha$ and $D\beta$ stored in the file unit 7 by an instruction from the controller 1.

First, the ALU 6 updates the texture animation state values indicative of the mosaic processing on the rectangular object using the values $D\alpha$ and $D\beta$ as follows:

$Sm \leftarrow Sm + \text{omit}(D\alpha)$ $Dm \leftarrow Dm * \text{mark}(D\beta)$ $N \leftarrow N+Sm*Dm$ (when $N<Nmin$, $N \leftarrow Nmin$, when $N>Nmax$, $N \leftarrow Nmax$)

$Nmin \leftarrow Nmin$ (no change)

$Nmax \leftarrow Nmax$ (no change)

omit(x): a function to truncate the values below the tenth decimal place mark(x): a selection of "1" or "−1" in accordance with positive/negative sign of x.

Next, the ALU 6 updates the texture animation state values indicative of the color conversion on the triangular object using the values $D\alpha$ and $D\beta$ as follows:

$SR \leftarrow SR + \text{omit}(Dx)$ $DR \leftarrow DR * \text{mark}(Dy)$ $SG \leftarrow SG + \text{omit}(Dy)$ $DG \leftarrow DG * \text{mark}(Dz)$ $SB \leftarrow SB + \text{omit}(Dz)$ $DB \leftarrow DB * \text{mark}(Dx)$ Then, the ALU 6 stores these values in the file unit 7.

Step T5

The image processor 9 performs mosaic processing on the landscape image, designated as the texture for the rectangular object, using the texture animation state values for the rectangular object, by an instruction from the controller 1.

Similarly, the image processor 10 performs color conversion on the portrait image, designated as the texture for the triangular object, using the texture animation state values for the triangular object, by an instruction from the controller 1.

Thereafter, the two texture images are stored into the file unit 7.

Step T6

The ALU 6 performs rendering when initiated by an instruction from the controller 1.

First, the ALU 6 generates a background image and initializes all the pixels of the background image using, e.g., color black:

$(R, G, B) = (0, 0, 0)$

Next, the ALU 6 sets the rectangular object, on which the mosaic-processed texture has been mapped, at a desired position on the background image, using the viewpoint condition values in the file unit 7, in accordance with the aforementioned rendering method.

Similarly, the ALU sets the triangular object, on which the color-converted texture has been mapped, at a desired position on the background image, using the viewpoint condition values in the file unit 7, in accordance with the aforementioned rendering method.

Note that texture mapping on these two objects is made such that the projection central axis in the perspective coordinate is vertical to the plane object.

The thus obtained image is stored in the file unit 7.

Step T7

The display unit 8 displays the generated image stored in the file unit 7 by an instruction from the controller 1. Thereafter, the process returns to step S8.

As described above, according to the present embodiment, texture animation state values are assigned to each of a plurality of objects in three-dimensional space, and the texture animation state values are changed in the process of the animation, thus texture animation is performed independently for each object. Accordingly, the present embodiment can provide a computer graphic apparatus which enables a CG animation having artistic effects which cannot be obtained by conventional CG devices and methods. In this apparatus, preparation of a plurality of texture animation processings in advance enables texture animation having the variety of texture changes. Even if the number of input texture images is small, the apparatus uses the small number of input texture images to produce a variation of textures.

Note that in the first embodiment, upon setting change amounts of a texture animation state, mosaic size and color components are incremented/decremented in a single direction, however, the present invention is not limited to this arrangement. For example, these change components are used as a function f(t) with respect to time t for changing mosaic size and color components. The function f(t) may be selected from pre-stored plurality of functions, or a user may input an arbitrary function using a keyboard and the like.

[Second Embodiment]

Next, CG animation processing according to the second embodiment of the present invention is described below.

Figure 12:
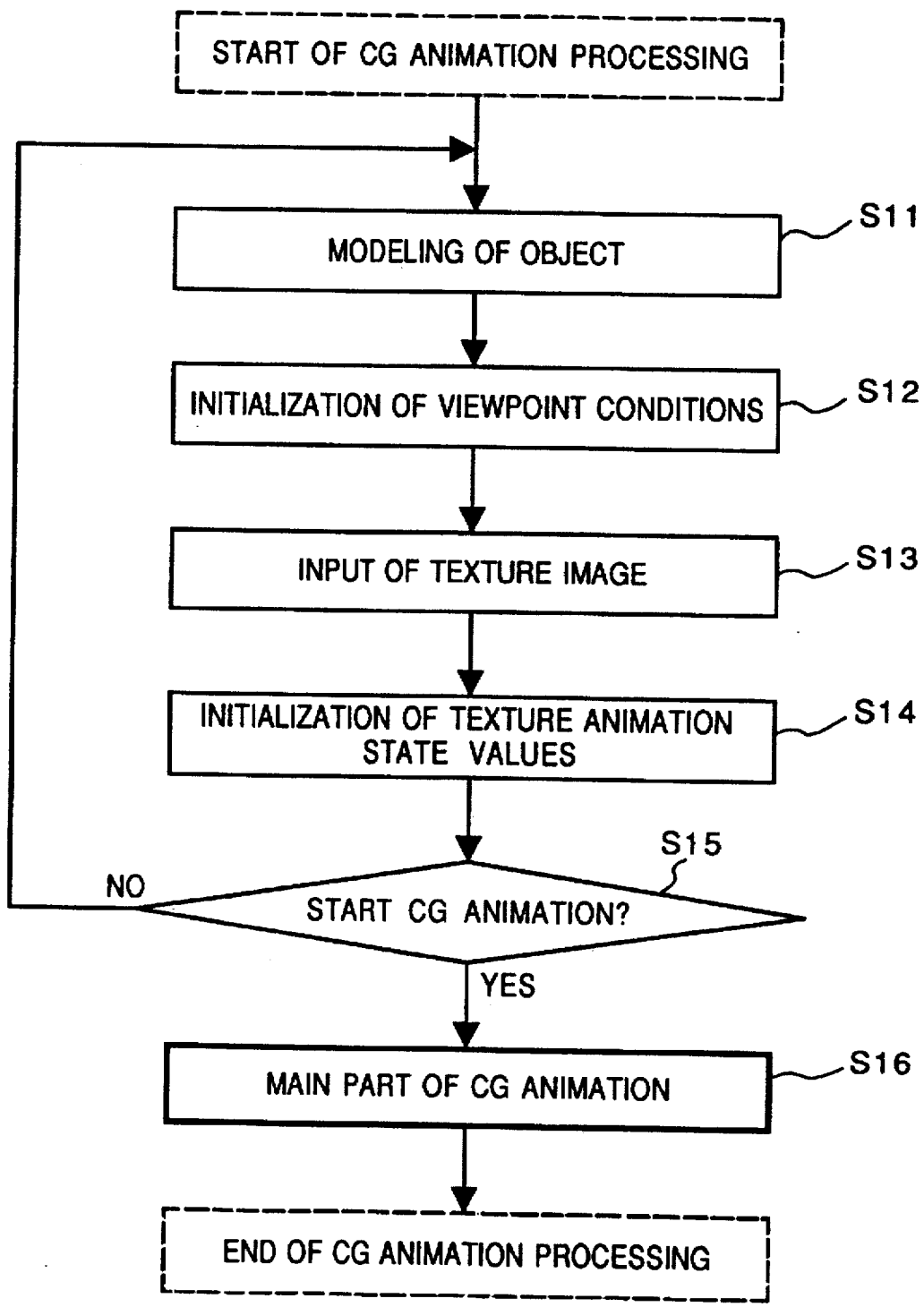
FIG. 12 is a flowchart showing the CG animation processing according to a second embodiment of the present invention.

FIG. 12 is a flowchart showing a CG animation according to the second embodiment. The processing procedure will be described in accordance with data flow, with reference to the flowchart in FIG. 12.

Note that for the sake of simplicity, the second embodiment employs rectangle and triangular objects similar to those in the first embodiment. In FIG. 12, steps S11 to S13 are identical to steps S1 to S3 in FIG. 9, and therefore explanation will start from step S14.

Step S14

The user inputs texture animation state values for the rectangular object. That is, the texture animation state values with respect to the input object are set as follows.

The controller 1 instructs to display

"INPUT TEXTURE ANIMATION STATE VALUES FOR RECTANGLE OBJECT"

"MAPPING IMAGE NO. NT→"
"ANIMATION NO. NA→"
on the display unit 8 and sets the data input unit 3 to data-input waiting status. Then, the user inputs numerals as a mapping image number (landscape image) and an animation number (mosaic processing) to be displayed after the arrows.

"MAPPING IMAGE NO. NT→1"
"ANIMATION NO. NA→1"

Next, in response to the designation of mosaic processing, the controller 1 instructs to display "INPUT INITIAL VALUES OF VARIABLES OF MOSAIC PROCESSING"
"UNIT NUMBER OF PIXELS N→"
"CHANGE SPEED Sm OF N→"
"INCREMENT/DECREMENT DIRECTION Dm OF CHANGE OF N→"
"MINIMUM VALUE Nmin OF N→"
"MAXIMUM VALUE Nmax OF N→"

on the display unit 8 to prompt the user to input initial values of variables of the mosaic processing animation. The user inputs respective values as a unit number of pixels, a change speed of the unit number of pixels, a increment/decrement direction of the unit number of pixels, a minimum value of the unit number of pixels and a maximum value of the unit number of pixels.

"UNIT NUMBER OF PIXELS N→5"
"CHANGE SPEED Sm OF N→2"
"INCREMENT/DECREMENT DIRECTION Dm OF CHANGE OF N→1"
"MINIMUM VALUE Nmin OF N→1"
"MAXIMUM VALUE Nmax OF N→100"

Note that the increment/decrement direction of the unit number of pixels for mosaic processing is "1" (increment) or "−1" (decrement).

Next, the user inputs texture animation state values for the triangular object.

That is, the controller 1 instructs to display

"INPUT TEXTURE ANIMATION STATE VALUES FOR TRIANGLE OBJECT"
"MAPPING IMAGE NO. NT→"
"ANIMATION NO. NA→"

on the display unit 8 and sets the data input unit 3 to data-input waiting status. Then, the user inputs numerals as a mapping image number (portrait image) and an animation number (color conversion) to be displayed after the arrows.

"MAPPING IMAGE NO. NT→2"
"ANIMATION NO. NA→2"

Next, in response to the designation of color conversion, the controller 1 instructs to display "INPUT INITIAL VALUES OF VARIABLES OF COLOR CONVERSION"
"R CHANGE SPEED SR→"
"R CHANGE INCREMENT/DECREMENT DIRECTION DR→"
"G CHANGE SPEED SG→"
"G CHANGE INCREMENT/DECREMENT DIRECTION DG→"
"B CHANGE SPEED SB→"
"B CHANGE INCREMENT/DECREMENT DIRECTION DB→"

on the display unit 8 to prompt the user to input initial values of variables of the color conversion animation. The user inputs respective values as an R-color change speed SR, an R-color change increment/decrement direction DR, a G-color change speed SG, a G-color change increment/decrement direction DG, a B-color change speed SB, and a B-color change increment/decrement direction DB.

"R CHANGE SPEED SR→10"
"R CHANGE INCREMENT/DECREMENT DIRECTION DR→1"
"G CHANGE SPEED SG→20"
"G CHANGE INCREMENT/DECREMENT DIRECTION DG →−1"
"B CHANGE SPEED SB→30"
"B CHANGE INCREMENT/DECREMENT DIRECTION DB→−1"

Note that the R, G, and B color increment/decrement direction of the unit number of pixels for mosaic processing is "1" (increment) or "−1" (decrement).

The input values are stored in the file unit 7.

Step S15

Next, the command input unit 2 is set to command-input waiting status by an instruction from the controller 1. In response to a message "START CG ANIMATION?", if the user inputs "YES", the process proceeds to the next step to start the CG animation, while if the user input "NO", the process returns to step S11 to repeat the above steps.

Step S16

A main part of the CG animation is performed by an instruction from the controller 1, and the processing is terminated by a CG animation termination instruction.

Figure 13:
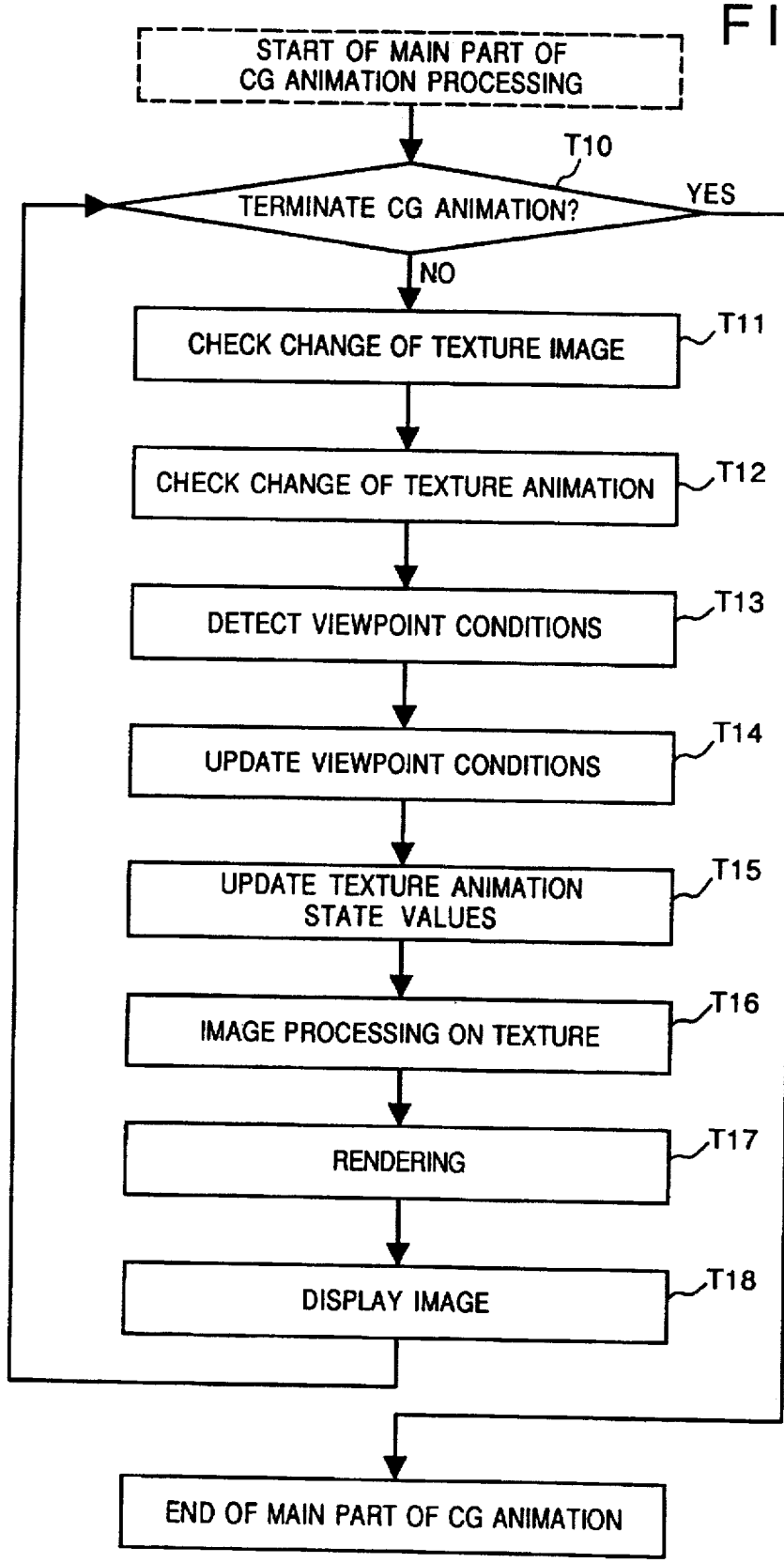
FIG. 13 is a flowchart showing a main part of the CG animation processing according to the second embodiment.

FIG. 13 shows the main part of the CG animation in step S16.

The processing will be described in detail in accordance with data flow.

Step T10

A mouse as the command input unit 2 is set to command-input checking status by an instruction from the controller 1. If the user has inputted a CG animation termination instruction by pressing a central button of the mouse, the CG animation ends, while if no instruction have been inputted, the process proceeds to the next step.

Step T11

The mouse as the command input unit 2 is set to command-input checking status. If the user has pressed a left button of the mouse, the texture number NT of the rectangle and triangular objects are updated:

$NT \leftarrow NT+1$

Note that if this calculation results in a numeral greater than the number of all texture images, the texture number is set to:

$NT \leftarrow 1$

Accordingly, in this embodiment, the objects are two of a rectangle and a triangle, the NT value becomes 1, 2, 1, 2, . . .

Step T12

The mouse as the command input unit 2 is set to command-input checking status. If the user has pressed a right button of the mouse, the animation number NA of animation state values of the rectangular and triangular objects is updated:

$NA \leftarrow NA+1$

Note that if this calculation results in a numeral greater than the number of all texture animations, the NA value is set to:

$NA \leftarrow 1$

As a result, the number of object of texture animation (there are plural types of texture animations) becomes one.

Step T13

By an instruction from the controller 1, the space ball as the viewpoint input unit 11 detects the respective movement components Dx, Dy, Dz of the moving vectors X,Y,Z and the respective rotation components Dα, Dβ in horizontal and vertical directions, and the values of the detected components are stored in the file unit 7.

Step T14

By an instruction from the controller 1, the ALU 6 updates the viewpoint position Xe, Ye, Ze using the movement components Dx, Dy, Dz stored in the file unit 7 from the following expressions:

$$Xe \leftarrow Xe+Dx$$

$$Ye \leftarrow Ye+Dy$$

$$Ze \leftarrow Ze+Dz$$

Further, the ALU 6 updates the azimuth angle α and the elevation angle β using the rotation components Dα and Dβ stored in the file unit 7 using the following expressions:

$$\alpha \leftarrow \alpha D\alpha$$

$$\beta \leftarrow \beta D\beta$$

Then the ALU 6 stores the updated Xe, Ye, Ze, α, β in the file unit 7.

Step T15

The AlU 6 updates the texture animation state values using the values Dx, Dy, Dz, Dα and Dβ in the file unit 7 by an instruction from the controller 1.

First, the ALU 6 updates the texture animation state values indicative of the mosaic processing on the rectangular object using the values Dα and Dβ as follows:

$$Sm \leftarrow Sm+omit(D\alpha)$$

$$Dm \leftarrow Dm*mark(D\beta)$$

$$N \leftarrow N+Sm*Dm(\text{when } N<Nmin, N \leftarrow Nmin, \text{when } N>Nmax, N \leftarrow Nmax)$$

$$Nmin \leftarrow Nmin \text{ (no change)}$$

$$Nmax \leftarrow Nmax \text{ (no change)}$$

omit(A): a function to truncate the values below the A-th decimal place mark(B): a selection of "1" or "−1" in accordance with positive/negative sign of B.

Next, the ALU 6 updates the texture animation state values indicative of the color conversion on the triangular object using the values Dα and Dβ as follows:

$$SR \leftarrow SR+omit(Dx)$$

$$DR \leftarrow DR*mark(Dy)$$

$$SG \leftarrow SG+omit(Dy)$$

$$DG \leftarrow DG*mark(Dz)$$

$$SB \leftarrow SB+omit(Dz)$$

$$DB \leftarrow DB*mark(Dx)$$

Then, the values are stored in the file unit 7.

Step T16

The image processor 9 performs mosaic processing on the landscape image, designated as the texture for the rectangular object, using the texture animation state values for the rectangular object, by an instruction from the controller 1.

Similarly, the image processor 10 performs color conversion on the portrait image, designated as the texture for the triangular object, using the texture animation state values for the triangular object, by an instruction from the controller 1.

Thereafter, the two texture images are stored in the file unit 7.

Step T17

The ALU 6 performs rendering by an instruction from the controller 1.

First, the ALU 6 generates a background image having the same size as that of a final image, and initializes all the pixels of the background image using, e.g., color black:

$$(R, G, B)=(0, 0, 0)$$

Next, the ALU 6 sets the rectangular object, on which the mosaic-processed texture has been mapped, at a desired position on the background image, using the viewpoint condition values in the file unit 7, in accordance with the aforementioned rendering method.

Similarly, the ALU 6 sets the triangular object, on which the color-converted texture has been mapped, at a desired position on the background image, using the viewpoint condition values in the file unit 7, in accordance with the aforementioned rendering method.

Note that texture mapping on these two flat objects is made such that the projection central axis in the perspective coordinate is vertical to the plane object.

Thus obtained image is stored in the file unit 7.

Step T18

The display unit 8 displays the generated image in the file unit 7 by an instruction from the controller 1. Thereafter, the process returns to step T10.

As described above, according to the second embodiment, texture animation state values are assigned to each of a plurality of objects in three-dimensional space, and the texture animation state values are changed in the CG animation generating process, thus the texture assigned to the object and the texture animation being performed with respect to the texture are changed into another texture and another texture animation. Further, in a case where the same animation is performed on textures of a plurality of different objects, the texture animation variables of the texture animation state values are changed, thus the respective animations are varied. Accordingly, the present embodiment can provide a computer graphic apparatus which enables a CG animation having artistic effects, e.g., dynamic change of textures mapped on objects, which cannot be obtained by conventional CG devices and methods.

In this apparatus, preparation of a plurality of texture animation processings in advance enables texture animation having the variety of texture changes. Even if a small number of texture images are inputted, the apparatus produces variation of textures using the input texture images.

[Third Embodiment]

Generally, when a user performs modeling with a CG modeling device, the user inputs three-dimensional coordinate values, as modeling data, with respect to three view (front view, top view, side view) windows, using a mouse or a keyboard.

However, in his case, the user needs expert knowledge and skill to perform modeling, for the user must always consider the relation between a three-dimensional object to be formed and the above-mentioned three views. For this reason, even in a simple work, e.g., building blocks or forming an object from clay, modeling must be made in entirely different ways from those in manual operation, and such inefficient conventional modeling has been a burden to the user.

The third embodiment provides a modeling method and apparatus to solve the above problems and to provide an excellent user interface for modeling.

Figure 14:
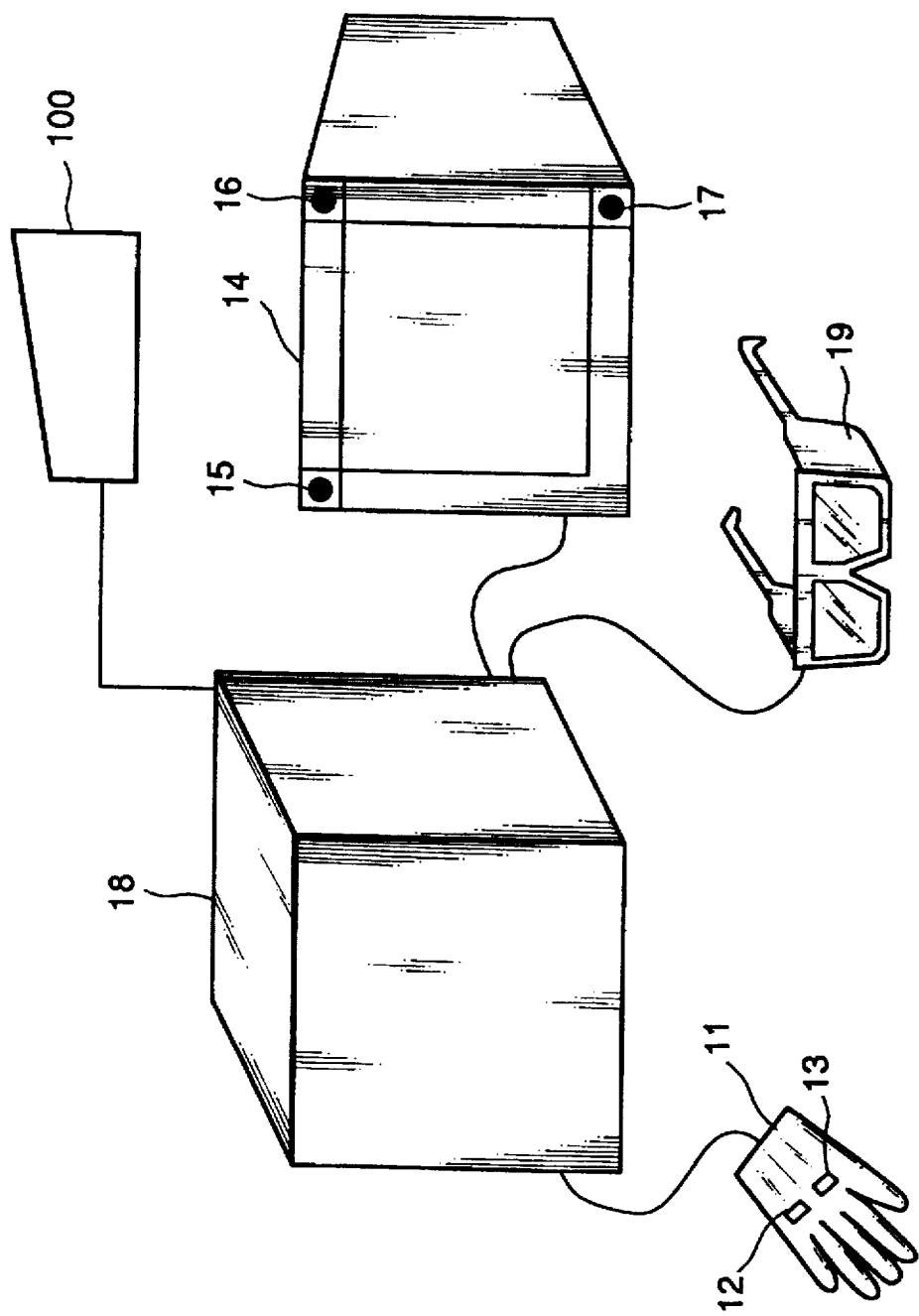
FIG. 14 illustrates a three-dimensional modeling apparatus according to a third embodiment of the present invention.
Figure 16:
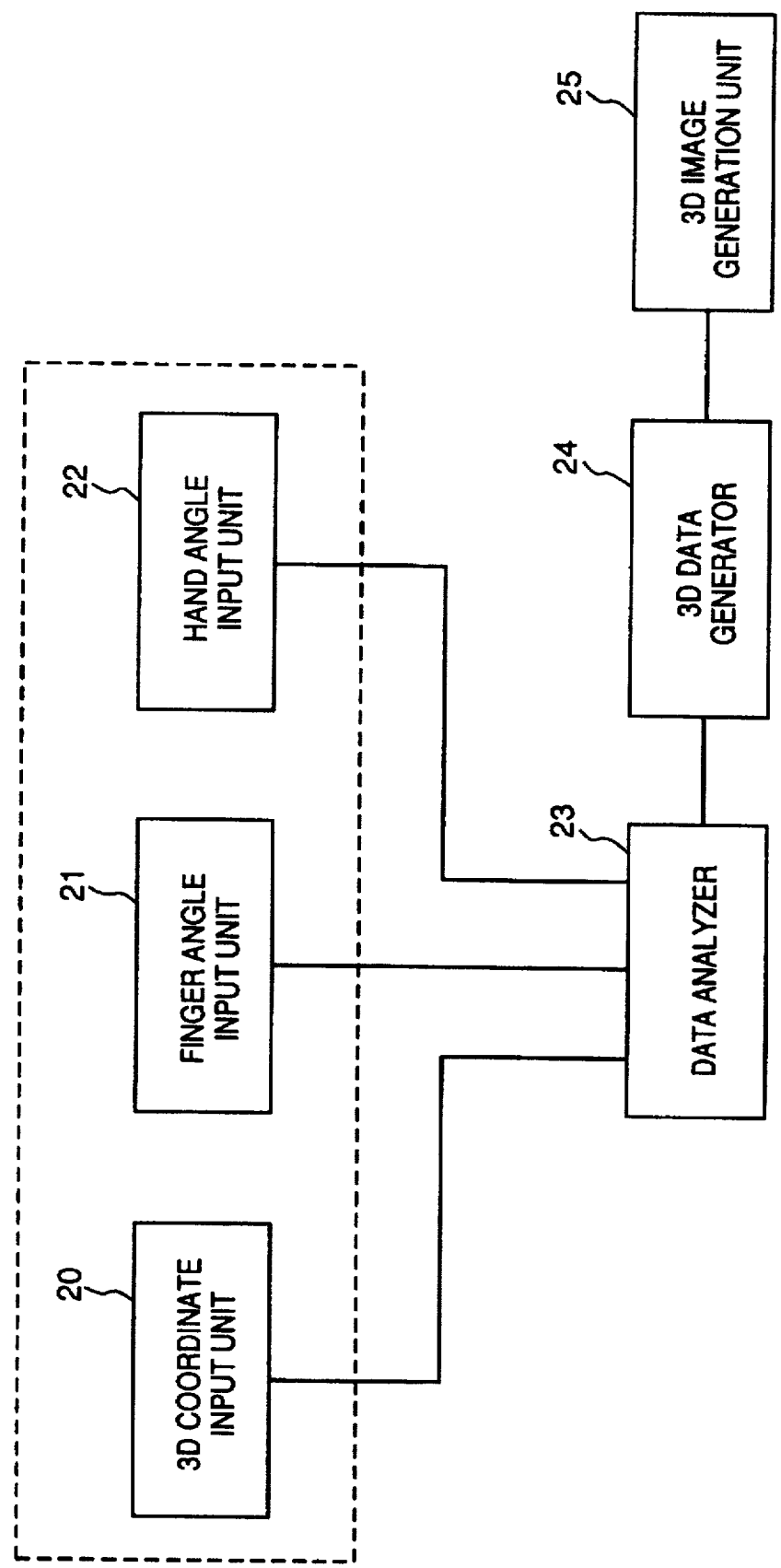
FIG. 16 is a block diagram showing the conception of a three-dimensional modeling program according to the third embodiment.

FIG. 14 shows the external appearance of the modeling apparatus according to the third embodiment. Numeral 11 denotes a glove which an operator wears. As the operator moves the hand, the glove 11 generates hand-position coordinate data in three-dimensional space and outputs the data in an ALU 18. The glove 11 includes ultrasonic oscillators 12 and 13 for emitting ultrasonic waves in a direction which the glove fingers point. Ultrasonic sensors 15 to 17, attached at different positions on a display monitor 14, receive the ultrasonic waves outputted from the glove 11. The three-dimensional position of the glove 11 can be calculated from the intensity of the ultrasonic waves received by the three ultrasonic sensors. As the ultrasonic oscillators 12 and 13 emit ultrasonic waves of different frequencies, the intensities of the ultrasonic wave received by the ultrasonic sensors 15 to 17 change at each frequency by changing the angle of the glove palm with respect to the sensors 15 to 17. With these values, a rolling angle (rotational angle with a straight line between the finger tip and the wrist as the rotational axis), a yaw angle (rotational angle with an axis vertical to the palm as the horizontal plane) and a pitch angle (rotational angle with an axis vertical to the yaw rotational axis and the pitch rotational axis) are obtained. The glove fingers respectively have a strain gauge (not shown) which varies its resistance value in accordance with bend of the fingers. When the user bends the fingers, the resistant value of the corresponding strain gauge varies. Thus, how much the finger is bent is detected from the change value. The display monitor 14 displays an image for the right eye and an image for the left eye at predetermined intervals, e.g., 1/60 second intervals, alternatively, under the control of the ALU 18. The display monitor 14 has a VRAM for the right eye and a VRAM for the left eye. Preferably, the accesses of these VRAM's are alternated at predetermined intervals, e.g., 1/60 second intervals, which the human eye cannot recognize. Numeral 19 denotes liquid crystal shutter glasses which perform opening/closing of the respective shutters in synchronization with the display interval of the display monitor 14. Specifically, the shutter for the right eye opens while the image for the right eye is displayed, on the other hand, the shutter for the left eye opens while the image for left eye is displayed. Thus, a viewer sees a three-dimensional image in front of the screen of the monitor 14. The ALU 18, having a construction as shown in FIG. 16, controls the overall three-dimensional modeling apparatus of this embodiment. The ALU 18 analyzes three-dimensional coordinate data, finger angle data, hand angle data from the glove 11, and generates three-dimensional object data based on the analyzed data. Then, the ALU 18 forms an image for the right eye and an image for the left eye for three-dimensional image display, and alternately displays these images on the display monitor 14 at predetermined time intervals. A keyboard 100 inputs various commands and data to the three-dimensional modeling apparatus.

Figure 15:
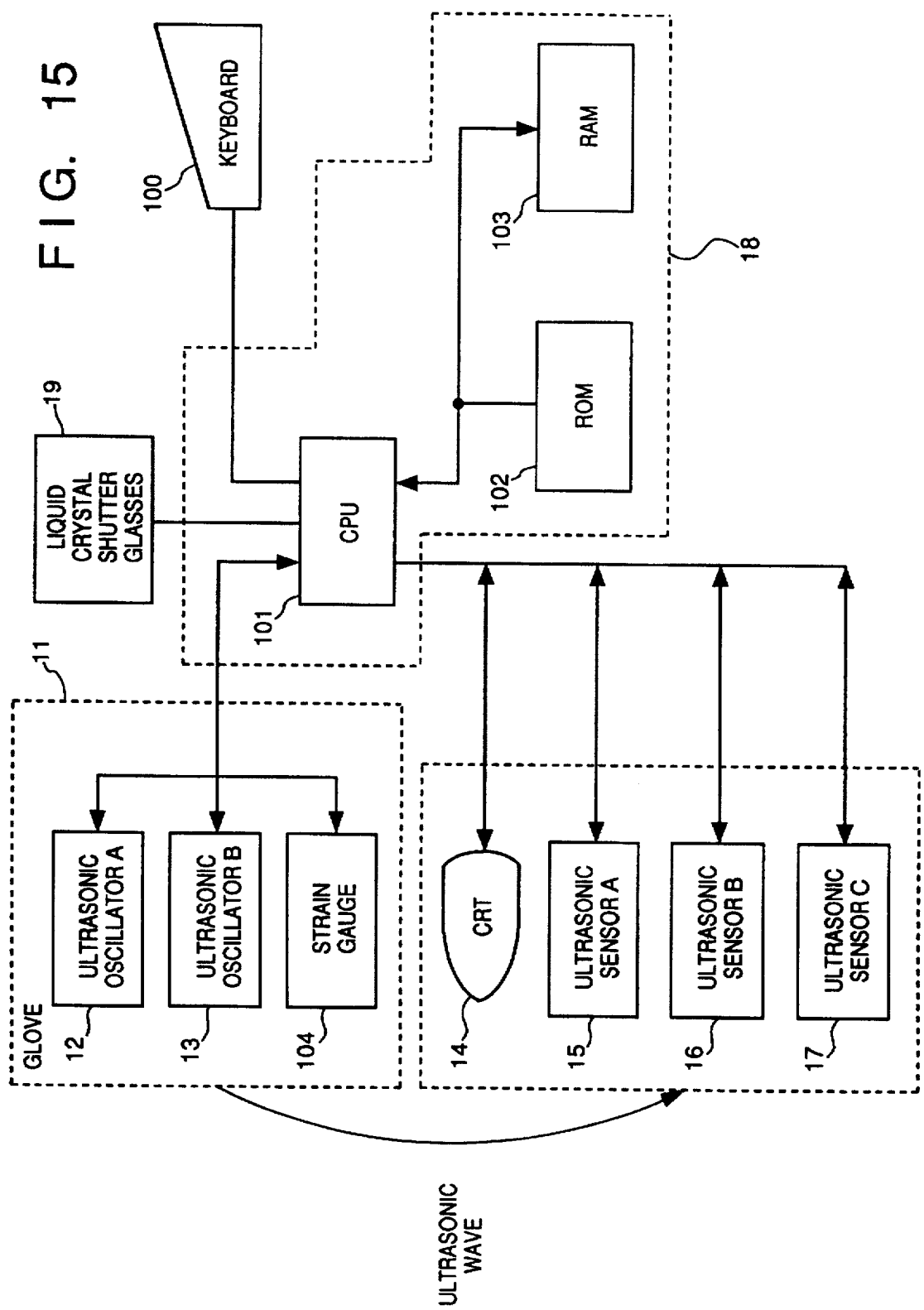
FIG. 15 is a block diagram showing the configuration of the three-dimensional modeling apparatus according to the third embodiment.

FIG. 15 shows the detailed construction of the three-dimensional modeling apparatus of the third embodiment. In FIG. 15, a CPU 101 executes a three-dimensional modeling processing program according to the third embodiment, stored in a ROM 102 in advance, to perform the overall processing. A RAM 103 is used for storing various data to execute the three-dimensional modeling processing program, or it is used as a work area. To enable three-dimensional modeling data input, the CPU 101 issues an oscillation-output start signal to the ultrasonic oscillators 12 and 13 of the glove 11. Then, the oscillators 12 and 13 start ultrasonic oscillation output. Further, the CPU 101 starts inputting of finger bend data from the strain gauge 14. The CPU 101 inputs sensed data from the ultrasonic sensors 15 to 17. To show the user a virtual three-dimensional image, the CPU 101 performs synchronization control between the opening/closing of the shutters of the liquid crystal shutter glasses 19 and the image display of the display monitor 14. Note that since the synchronization control is periodic, it may be performed by using a signal from a timer.

FIG. 16 is a block diagram showing the three-dimensional modeling processing according to the third embodiment. The three-dimensional modeling processing comprises a data input unit 200 for inputting data from the glove 11, a data analyzer 23, a 3D (three-dimensional) data generator 24 and a 3D image generation unit 25. The data input unit 200 includes a 3D coordinate input unit 20, a finger angle input unit 21 and a hand angle input unit 22. The 3D coordinate input unit 20 controls oscillation output of the ultrasonic oscillators 12 and 13, and inputs ultrasonic wave data from the ultrasonic sensors 15 to 17. The finger angle input unit 21 inputs finger bend data from the strain gauge 104. The hand angle input unit 22 inputs the ultrasonic wave data from the ultrasonic sensors 15 to 17 for hand angle detection. The data analyzer 23 analyzes signals from the 3D coordinate input unit 20, the finger angle input unit 21 and the hand angle input unit 22, and calculates three-dimensional coordinate data (x,y,z), five finger angles ($\alpha 1$, $\alpha 2$, $\alpha 3$, $\alpha 4$, $\alpha 5$) and hand angle ($\beta\gamma\theta$). The 3D data generator 24 generates three-dimensional data based on the above data. The 3D image generation unit 25 generates images respectively shaded for the right eye and the left eye from the three-dimensional data, and the display monitor 14 displays these data alternatively at predetermined time intervals.

To clarify the feature of the third embodiment, modeling and rendering on a three-dimensional object according to the third embodiment is described below.

<Modeling>

Modeling in this embodiment is performed inputting shape data of a three-dimensional object in a modeling coordinate system. Note that the modeling coordinate system is a coordinate system for defining and manipulating the shape of an object. For example, when modeling of an object shown in FIG. 2 is performed, first, a modeling coordinate system 31 having one of the vertexes of the object as an original point 30 is set. The coordinate data of the eight vertexes in this coordinate system are represented as follows:

| 8 | | | (Vertex numbers are given from the top) |
|---|---|---|---|
|   |   |   | (line 1) |
| (0.0 | 0.0 | 0.0) | (line 2) |
| (1.0 | 0.0 | 0.0) | |
| (1.0 | 1.0 | 0.0) | |
| (0.0 | 1.0 | 0.0) | |
| (0.0 | 0.0 | −1.0) | |
| (1.0 | 0.0 | −1.0) | |
| (1.0 | 1.0 | −1.0) | |
| (0.0 | 1.0 | −1.0) | (line 9) |

Numeral "8" at (line 1) indicates that the number of vertexes is eight. Data at (line 2) to (line 9) indicate the coordinate data of the respective eight vertexes of the object. Further, the data at (line 2) to (line 9) are indicative of the x,y,z coordinate values of the respective vertexes.

Next, surface loop data indicative of connection of points forming surfaces are represented as follows:

| 6 |   |   |   | (line 1') |
|---|---|---|---|-----------|
| 4 |   |   |   | (line 2') |
| 1 | 2 | 3 | 4 | (line 3') |
| 4 |   |   |   | (line 4') |
| 5 | 6 | 7 | 8 | (line 5') |
| 4 |   |   |   | (line 6') |
| 4 | 3 | 7 | 8 | (line 7') |
| 4 |   |   |   | (line 8') |
| 1 | 5 | 8 | 4 | (line 9') |
| 4 |   |   |   | (line 10') |
| 1 | 2 | 5 | 6 | (line 11') |
| 4 |   |   |   | (line 12') |
| 2 | 6 | 7 | 3 | (line 13') |

Numeral "6" at (line 1') indicates that the object has six surfaces. The subsequent data at (line 2') and (line 3') are data regarding the first surface among the six surfaces. Similarly, data at (line 6') and (line 7'), data at (line 8') and (line 9'), data at (line 10') and (line 11'), data at (line 12') and (line 13') are data regarding the second to sixth surfaces. Numeral "4" at (line 2') indicates that the number of vertexes of the first surface is four. Data at (line 3') indicates that the first surface is constructed by the vertexes having vertex numbers 1, 2, 3 and 4. Similarly, data at (line 4') and (line 5'), data at (line 6') and (line 7'), data at (line 8') and (line 9'), data at (line 10') and (line 11'), data at (line 12') and (line 13') indicate the number of vertexes and the vertex numbers of the second to sixth surfaces.

Thus, the construction of the object shown in FIG. 2 can be represented using the above vertex coordinate data and the surface loop data. These data are referred to as modeling data.

<Rendering>

Upon completion of three-dimensional modeling, projection conversion is performed. This conversion corresponds to, in photography, selection of lens (focal distance= magnification), determination of place (viewpoint) and direction of camera (view axis). Note that as the rendering of this embodiment is the same as the foregoing rendering, therefore, the explanation of the rendering is omitted.

Figure 17:
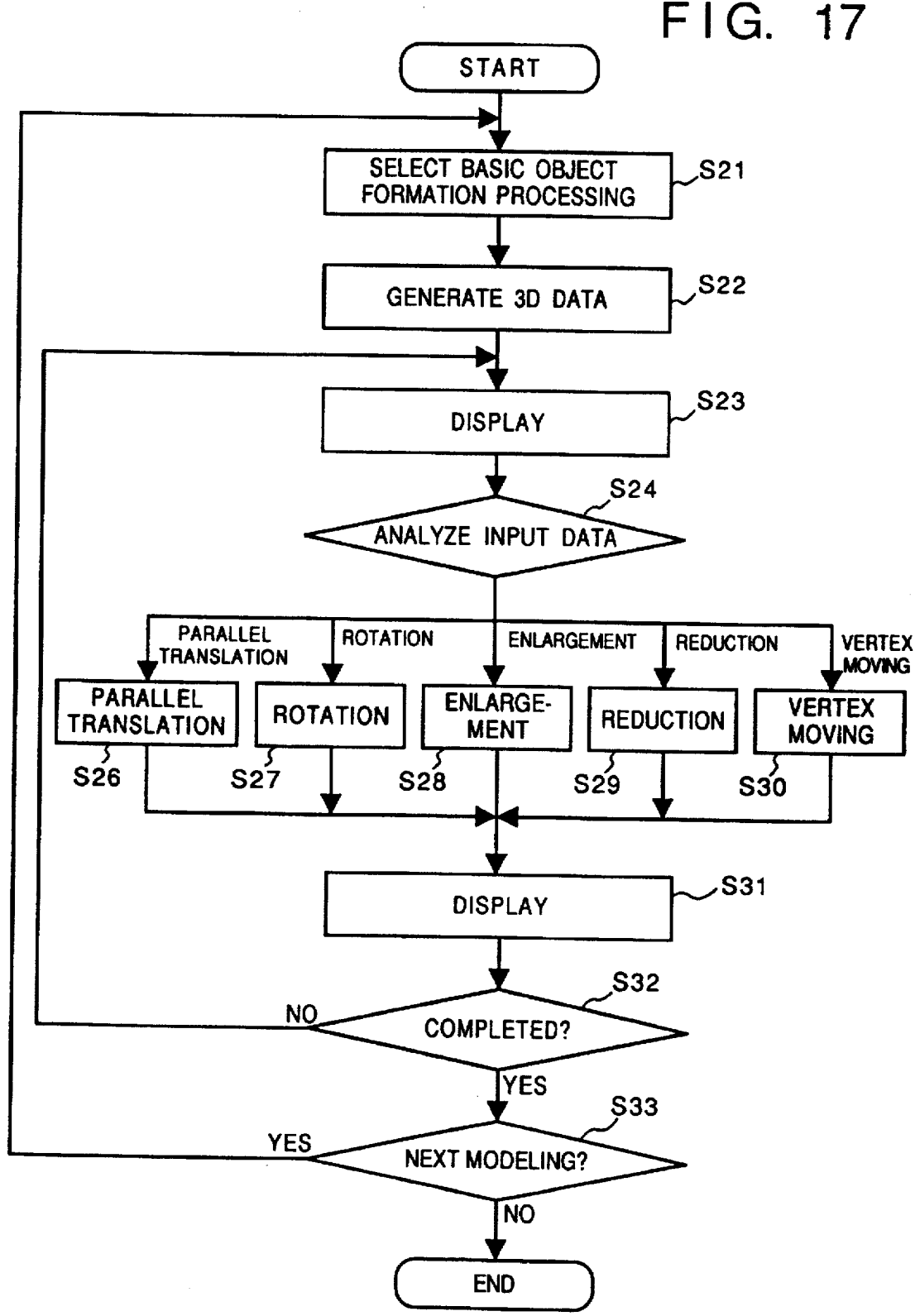
FIG. 17 is a flowchart showing the three-dimensional modeling processing according to the third embodiment.

Next, three-dimensional object modeling according to the third embodiment is described with reference to the flowchart in FIG. 17.

First, a user wears the liquid crystal shutter glasses 19, and the glove 11 on his/her right hand before the user starts modeling using the three-dimensional modeling apparatus of this embodiment. Then, the user turns the power of the apparatus on. A three-dimensional modeling program stored in the ROM 102 is then started. Hereinafter, the procedure of the three-dimensional modeling processing program is described.

Step S21

Figure 18:
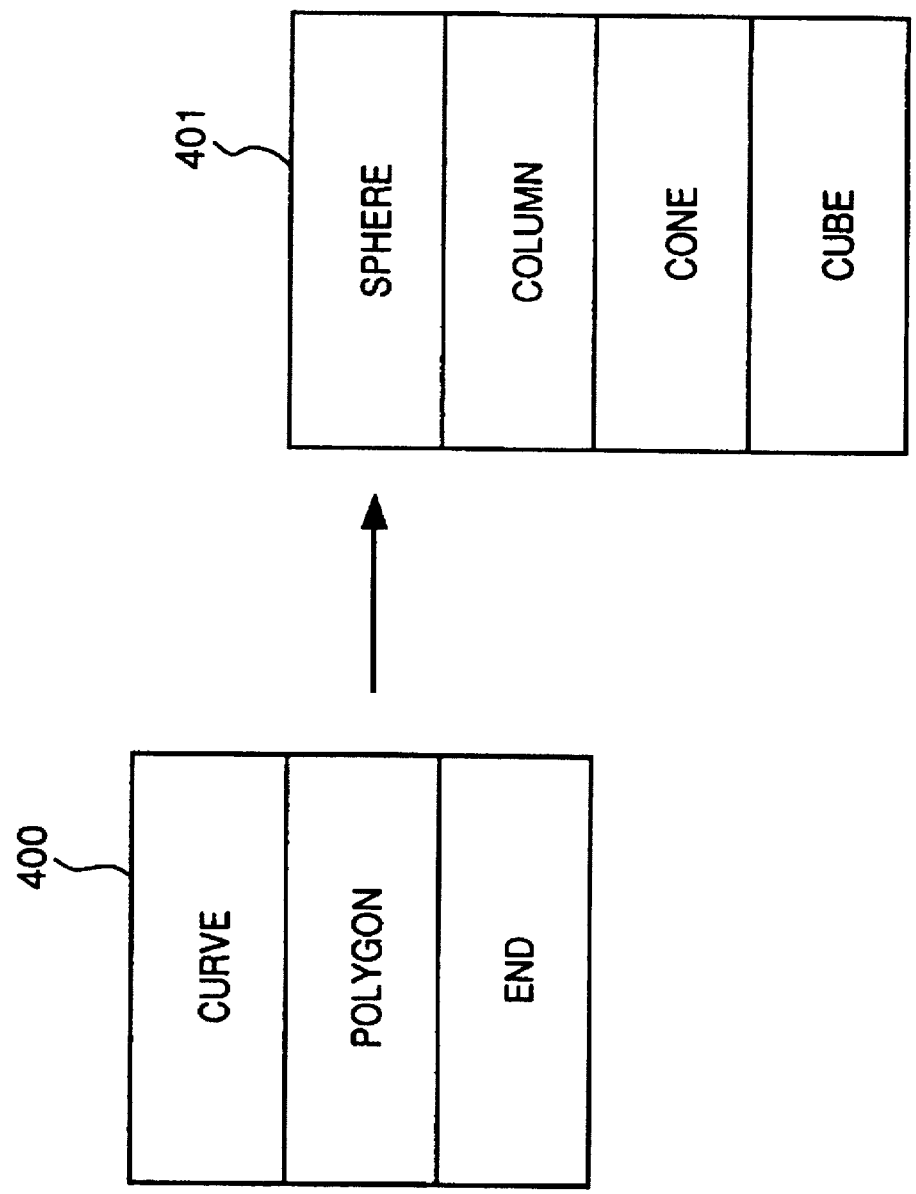
FIG. 18 illustrates the structure of an operation menu.

A menu 400 as shown in FIG. 18 is displayed on the display monitor 14 so that the user selects object-formation processing from the menu.

The menu 400 includes "Curve" and "Polygon". "Curve" is processing for generating a curved line. "Curve" is used when a plane is formed by combining curved lines, or a three-dimensional object is formed by rotating a curved line around an arbitrary axis. "Polygon" is processing for obtaining a three-dimensional object shape by processing and/or combining prepared basic three-dimensional data. As "Polygon" has three-dimensional information, the user can see a three-dimensional image floated in three-dimensional space with the liquid crystal shutter glasses 19. The user presses, e.g., "Polygon" button on the menu 400 by using the index finger of the glove 11. Then, a sub-menu 401 as shown in FIG. 18 is displayed. Next, the user selects, e.g., "Cube", from the sub-menu 401 as the type of the polygon.

Step S22

The 3D data generator 24 generates a basic figure image data for the right eye and a basic figure image data for the left eye from the basic figure selected in step S1. These data are generated by shifting the view position in the viewpoint coordinate system as shown in FIG. 3 by view distance f on the x-axis so that the user sees a three-dimensional basic figure on the display monitor 14. The generated three-dimensional basic figure image data are transferred to the 3D image generation unit 25.

Step S23

The 3D image generation unit 25 alternatively generates a basic figure image for right eye and a basic figure image for left eye based on the three-dimensional basic figure image data on the display monitor 14 at ⅟60 sec. time intervals. The user sees the basic figure floated in three-dimensional space through the liquid crystal shatter glasses 19.

Step S24

Inputting of data from the ultrasonic sensors 15 to 17 and the data from the strain gauge 104 is started. The input data is analyzed to discriminate an instruction to the selected basic figure. The process proceeds to one of the next step, steps S26 to S30, in accordance with the instruction. That is, if the instruction is a parallel translation, the process proceeds to step S26; if rotation, to step S27; if enlargement, to step S28; if reduction, to step S29; and if vertex moving (shape changing), to step S30.

It should be noted that the instruction by the user with respect to the basic figure is made by the following method.

In parallel translation, the user can move the position of the basic figure by virtually grasping the basic figure floating in three-dimensional space with the glove 11 and moving the figure. The user moves the right hand wearing the glove 11 to the position where the basic figure exists, and bends the fingers as if to clench the fist. This operation fixes the object at the position of the glove. As the user moves the glove, the basic figure moves with the glove. The user opens the hand at a desired position, then the basic figure leaves the glove. On the other hand, the three-dimensional modeling apparatus of the present embodiment outputs ultrasonic waves from the ultrasonic oscillators 12 and 13, and analyzes ultrasonic wave pattern data detected by the ultrasonic sensors 15 to 17, to calculates the positional relation between the actual position of the hand and the basic figure floating in the three-dimensional virtual space.

Next, in rotation, the user can designate change of rotational angle of the basic figure by virtually grasping the basic figure with the glove 11 and rotating the figure.

Figure 19:
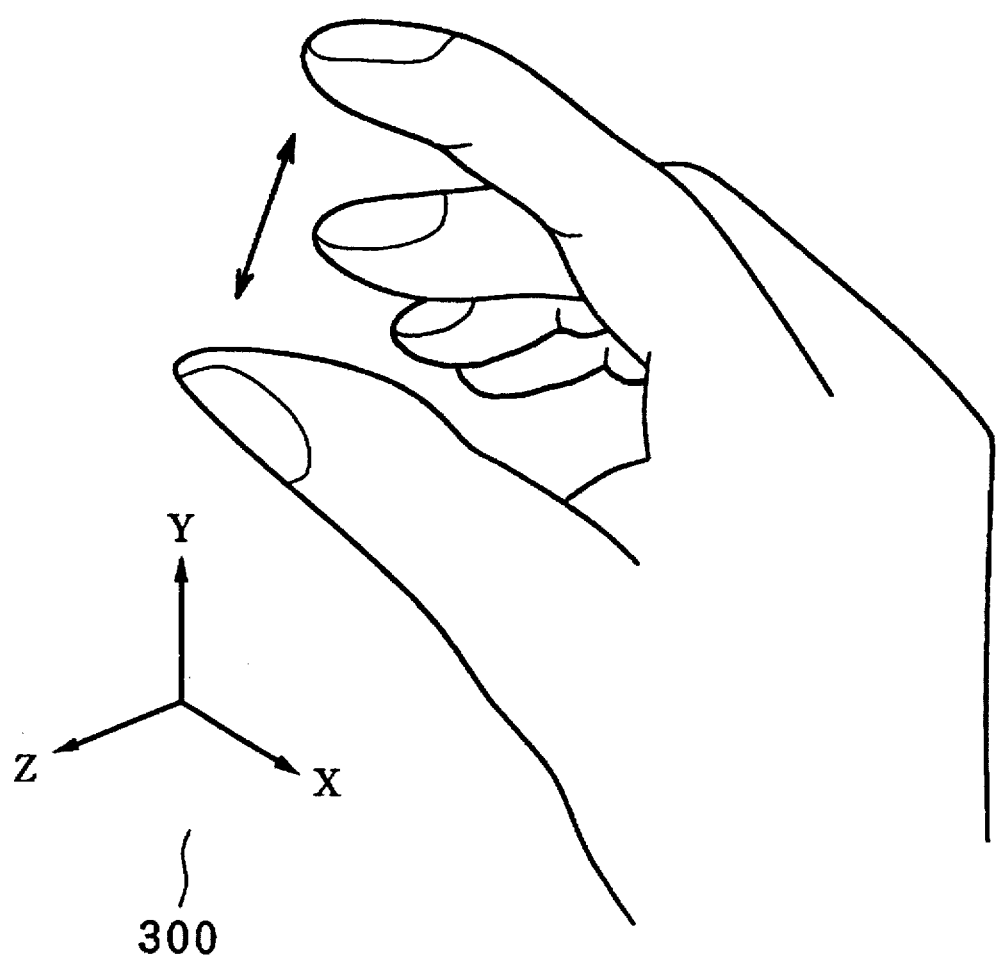
FIG. 19 is an explanatory view of an object enlargement/reduction method.

In enlargement, the user can designate enlargement by moving the glove to the basic figure and bending, e.g., the thumb of the glove to designate enlargement. The three-dimensional modeling apparatus recognizes this operation as an enlargement instruction, and starts the enlargement processing. Next, the user widens the interval between the thumb and the index finger in an enlargement direction (any of x-, y- or z-axis direction (300)) as shown in FIG. 19 to designate a magnification ratio.

In reduction, the user moves the glove to the basic figure, and bends, e.g., the index finger to designate reduction. The three-dimensional modeling apparatus recognizes this operation as reduction instruction. The user narrows the interval between the thumb and the index finger in a reduction direction (any of x-, y- or z-axis direction (300)) as shown in FIG. 19 to designate a reduction ratio.

In vertex moving (deformation), the user virtually grasps the vertex of the basic figure to designate deformation of the figure. For example, the user grasps the summit of the basic figure and moves the summit in an arbitrary direction, thus designates deformation of the basic figure.

Step S26

The data analyzer 23 analyzes the ultrasonic wave pattern data detected by the ultrasonic sensors 15 to 17, and obtains the respective coordinates of the basic virtual three-dimensional figure after the parallel translation by calculating the positional relation between the basic figure floating in the three-dimensional virtual space and the position at which the hand wearing the glove actually exists and the amount of movement of the basic figure. Then, the 3D data generator 24 generates three-dimensional image data based on the moved basic figure data, i.e., a basic figure data for the right eye and a basic figure data for the left eye, and transfers these data to the 3D image generation unit 25.

Step S27

The data analyzer 23 analyzes the ultrasonic wave pattern data, corresponding to the rotation instruction, detected by the ultrasonic sensors 15 to 17, and obtains hand angles. Then the data analyzer 23 generates rotational direction data and rotational amount data, performs rotational conversion where the basic figure is rotated at the angles (e.g., fine transformation), and obtains the respective coordinates after the rotation. The 3D data generator 24 generates three-dimensional image data based on the rotated basic figure data, i.e., a basic figure data for the right eye and a basic figure data for the left eye, and transfers these data to the 3D image generation unit 25.

Step S28

The data analyzer 23 analyzes the ultrasonic wave pattern data detected by the ultrasonic sensors 15 to 17 and the finger bend data from the strain gauge 104, and calculates the enlargement direction and the magnification ratio. Then, the data analyzer 23 performs enlargement conversion in accordance with the obtained enlargement direction and the magnification ratio, and obtains the respective coordinates of the basic figure after the enlargement. Then, the 3D data generator 24 generates three-dimensional image data based on the enlarged basic figure data, i.e., basic figure data for the right eye and basic figure data for the left eye, and transfers these data to the 3D image generation unit 25.

Step S29

The data analyzer 23 analyzes the ultrasonic wave pattern data detected by the ultrasonic sensors 15 to 17 and the finger bend data from the strain gauge 104, and calculates the reduction direction and the reduction ratio. Then, the data analyzer 23 performs reduction conversion in accordance with the obtained reduction direction and the reduction ratio, and obtains the respective coordinates of the basic figure after the reduction. Then, the 3D data generator 24 generates three-dimensional image data based on the reduced basic figure data, i.e., basic figure data for the right eye and basic figure data for the left eye, and transfers these data to the 3D image generation unit 25.

Step S30

The data analyzer 23 analyzes the ultrasonic wave pattern data detected by the ultrasonic sensors 15 to 17 and the finger bend data from the strain gauge 104, and discriminates the position of the designated vertex of the basic figure. Then, the data analyzer 23 calculates the vertex moving direction and the moving amount, performs deformation of the basic figure based on the obtained vertex moving direction and the moving amount, and obtains the respective coordinates of the basic figure after the deformation. Then, the 3D data generator 24 generates three-dimensional image data based on the moved basic figure data, i.e., basic figure data for the right eye and basic figure data for the left eye, and transfers these data to the 3D image generation unit 25.

Step S31

The 3D image generation unit 25 alternatively generates a basic figure image for the right eye and a basic figure image for the left eye based on the received three-dimensional based figure image data at 1/60 sec. time intervals on the display monitor 14. The user wearing the liquid crystal shatter glasses 19 sees a three-dimensional basic figure floating in three-dimensional space.

Step S32

In this step, whether or not the processing of the basic figure has been completed is checked. For example, whether or not the user has formed a fist with his/her right hand wearing the glove 11 may be determined as completion of processing upon a basic figure. If NO, i.e., a processing termination instruction has not been detected, the process returns to step S23 to continue the modeling of the basic figure, while if YES, i.e., the processing termination instruction has been detected, the process proceeds to step S33 in which whether or not the modeling is terminated is checked. For example, whether or not the user forms "scissors" with his/her right hand wearing the glove 11 may be determined as completion of modeling. If NO, i.e., a modeling termination instruction has not been detected, the process returns to step S21, to perform the modeling of the next figure.

In conventional object rotating methods, the aforementioned three view (front view, top view, side view) windows are displayed, then rotational axes of the respective windows are set. After the inclination of the axes are changed, an object is rotated around the axes. This operation is so difficult that even a skilled operator tries many times. However, the rotating method of the present embodiment allows an operator to easily perform rotation of an object in a manner close to a human method.

It should be noted that in steps S31 and S32, the operator forms his/her hand as a "fist" and "scissors" as processing termination instruction, however, the instruction may be made using a menu image displayed on the display monitor 14. For example, the operator may select an "end" button on the menu.

As described above, according to the modeling of the present embodiment, modeling can be performed in a manner close to a human operation.

[Fourth Embodiment]

In the third embodiment, an arbitrary shape can be formed by combining basic objects such a sphere, a column, a cone and a cube. Further, a solid, formed by revolution, can be formed by selecting the "Curve" of the menu in FIG. 18 and rotating a curved line around an arbitrary axis.

A polygon can be formed by connecting the start point and the end point of a curved line, and an arbitrary shape can be formed by combining the thus-obtained polygons.

In the third embodiment, all operation are made using the glove 11, however, menu selection, detailed positional designation and enlargement of an object can be made by using a pointing device such as a mouse.

In the third embodiment, three-dimensional effect can be obtained by employing the display monitor 14 and the liquid crystal shatter glasses 19 in synchronization with the operation of the display monitor 14. However, a helmet (head mount display) having two monitors for displaying images respectively for the right eye and the left eye can attain the same effect.

In the third embodiment, the detection of the position and angle by the glove 11 are made by using ultrasonic waves, however, a magnetic generator may be attached to the glove 11 and the position and angle may be detected by magnetic sensors, etc.

In the third embodiment, the strain gauge is used for detecting the glove finger angle. However, optical fibers may be attached along the fingers for the same purpose. That is, one end of the optical fiber is made a mirror, and the other end inputs light of a predetermined intensity. If the fiber is straight, i.e., the finger is straightened, the amount of reflected light is approximately 100% of the input light amount. However, if the fiber is bent, i.e., the finger is bent, the light leaks out of the fiber, and the reflected light amount is decreased. Accordingly, the finger bend angle can be obtained by measuring the reflected light amount.

In the third embodiment, object deformation is made by grasping and moving the vertex of the object with the glove fingers, however, as the position and angle of the glove palm are detected, deformation can be made by pressing the vertex with the glove palm.

Further, in the third embodiment, the operator performs deformation wearing the glove 11 on only one hand, however, the operator may wear the glove 11 on the right and left hands, and perform deformation by using both hands.

As described above, the three-dimensional modeling apparatus according to the third and fourth embodiments allows an operator to easily perform modeling upon a three-dimensional object floating in three-dimensional virtual space by using the hand. Accordingly, the operator can perform modeling with an operational sense close to actual manipulation.

[Fifth Embodiment]

Next, the fifth embodiment will be described below.

In the first to fourth embodiments, modeling is initially performed and then texture animation processing is performed. That is, mapping attribute information is given as initial values, thereafter, rendering is made in accordance with the information, and the rendered image is displayed.

However, in the above animation processings, if the processed result is not satisfactory, the operator has to again set the various parameters for mapping and perform rendering with respect to all the scenes.

In the fifth embodiment, the above drawback is considered.

Figure 20:
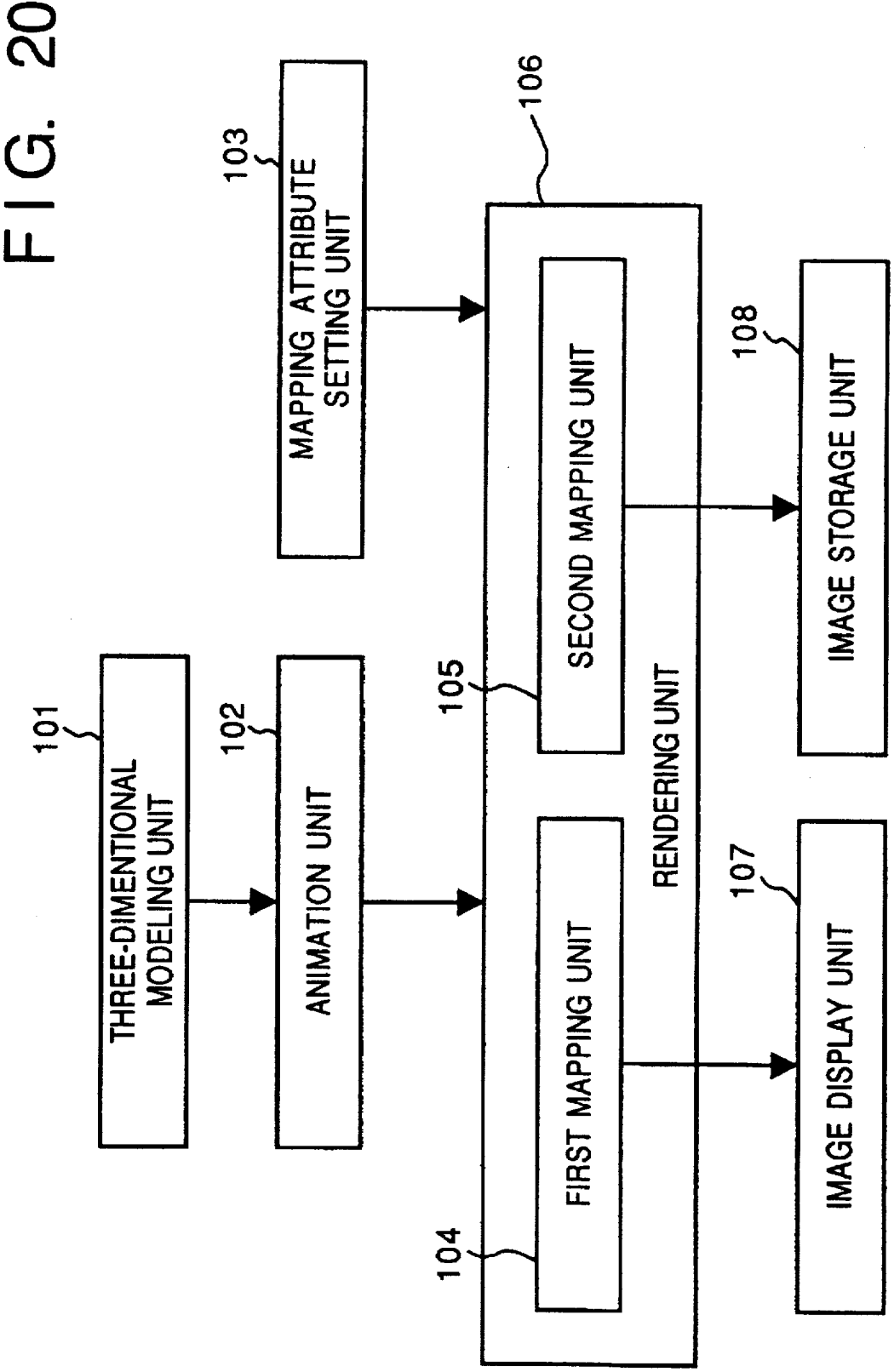
FIG. 20 is a block diagram showing the construction of a CG generating system according to a fifth embodiment of the present invention.

FIG. 20 shows the construction of a CG generating system according to the fifth embodiment.

In FIG. 20, numeral 101 denotes a three-dimensional modeling unit for obtaining three-dimensional coordinate data and generating a three-dimensional shape; 102, an animation unit for applying motion to the three-dimensional data from the three-dimensional modeling unit 101 and generating animation data; 103, a mapping attribute setting means for designating a texture image necessary for texture mapping, a mapping method (surface mapping, spherical mapping, environmental mapping etc.), a position of image (designating a portion of texture image to be cut out and designating a portion of an object image where the cut-out image portion is to be mapped); and 104, a first mapping unit for performing simple mapping of the texture image onto the animation data obtained from the animation unit 102. Note that "simple mapping" is mapping where calculation preci-sion is lowered, i.e., for attaining high-speed mapping calculation. Specifically, here the calculation is made not at a doubled precision but at a singular precision. The image is automatically converted to a predetermined sized image for the highest speed calculation by the first mapping unit 104, and image enlargement/reduction is performed upon the converted image. In case of CG generation according to the NTSC standards, the number of frames to be displayed for one second is thirty. Normally, the CG animation in this case requires thirty CG frames per one second. However, it is difficult to generate thirty CG images for one second while performing mapping. For this reason, the first mapping unit 104 automatically performs calculation for a predetermined number of frames which can be generated for one second. This enables real-time mapping on the images. However, as the calculation precision is lowered and the size of image to be mapped is changed, further, the number of generated images is reduced, the resulting animation to be displayed is slightly different from the result from the final higher-precision calculation. However, this lowered precision can fully provide images for confirming the result of mapping according to the set mapping attribute information. Numeral 105 denotes a second mapping unit for applying the texture image onto the animation data. That is, the calculation is made at a higher precision and the size of the image is arbitrary. Further, the number of images to be generated for one second is corresponding to that according to TV regulations. Thus, the generated images are stored in files, which obtains smooth motion of displayed animation. Note that this final calculation requires more time.

Numeral 106 denotes a rendering unit for shading the animation data. The rendering unit 106 includes the first mapping unit 104 and the second mapping unit 105. Numeral 107 denotes an image display unit for displaying the images from the first mapping unit 104 on a CRT; and 108, an image storage unit for storing the image data from the second mapping unit 105 into a hard disk.

Next, the operation of the fifth embodiment will be described below. Note that the modeling and rendering processings of the fifth embodiment are the same as those in the first to fourth embodiments. The mapping according to the fifth embodiment, as a part of the rendering is made by coordinate conversion among four coordinate systems, i.e., a texture coordinate system, an object surface coordinate system, the world coordinate system and the screen coordinate system, as shown in FIG. 22.

The texture coordinate system corresponds to two-dimensional arrangement of image. The conversion from texture coordinates (s, t) to object surface coordinates (x, y) is a liner conversion:

$$x = as + b$$
$$y = ct + d$$

a, b, c and d are arbitrary constants.

The conversion from the object surface coordinates to the world coordinates is liner or non-linear, depending upon the conversion setting. The conversion from the world coordinates to the screen coordinates is made by a normal rendering procedure. That is, the conversion is represented by a 4×4 simultaneous matrix of the liner conversion from the world coordinate system to the viewpoint coordinate system and the perspective conversion from the viewpoint coordinate system to the screen coordinate system. In this manner, the mapping is the conversion from two-dimensional texture into two-dimensional texture. This may be considered similar to image processing.

Figure 21:
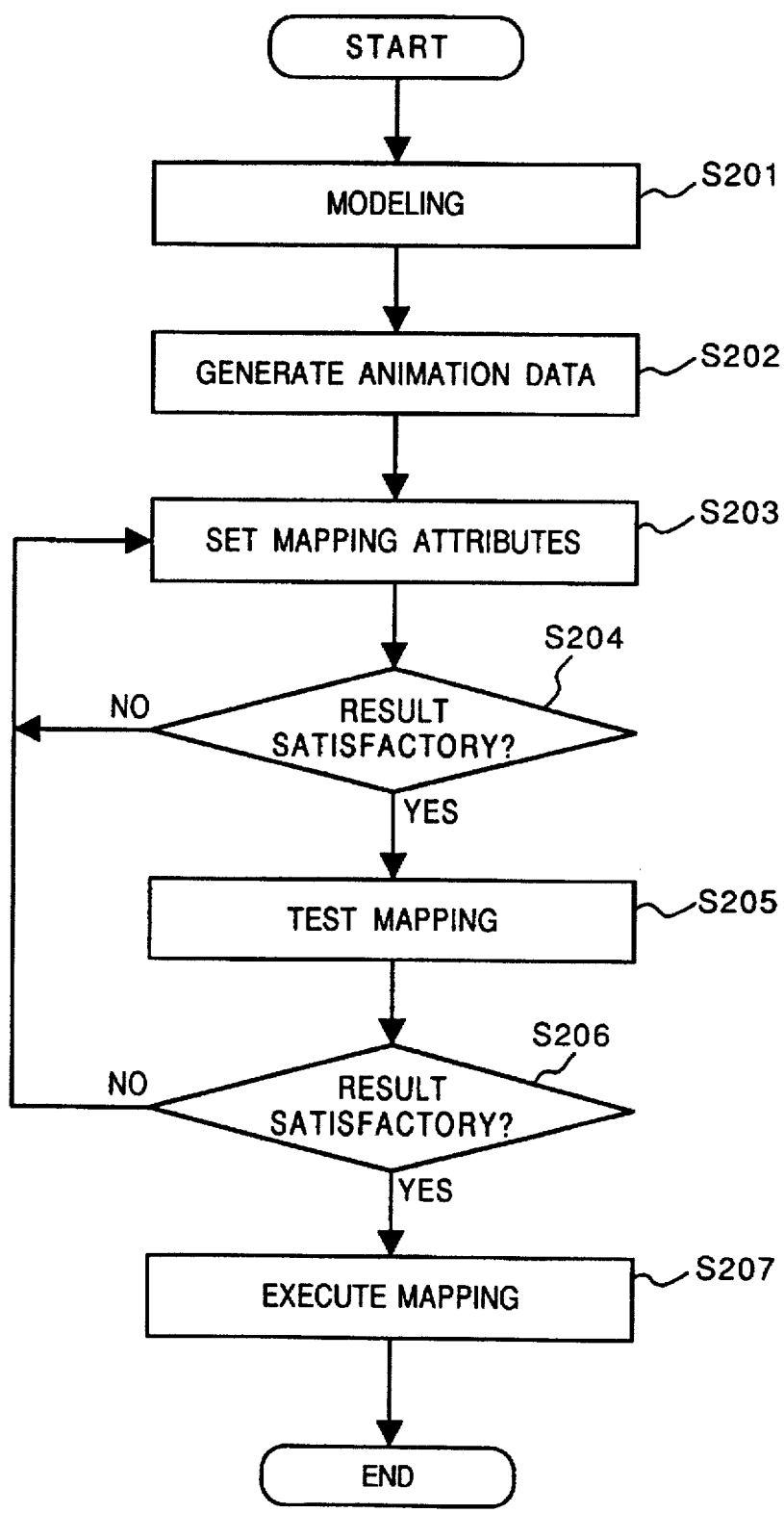
FIG. 21 is a flowchart showing the animation generation procedure according to the fifth embodiment.

The actual animation generation procedure according to the fifth embodiment will be described with reference to the flowchart in FIG. 21.

<Step S201>

The operator manipulates the three-dimensional modeling unit 101 to generate a three-dimensional shape. More specifically, the operator uses a pointing device such as a mouse, with looking at a monitor, and thus performs operation on three views. For example, a plane is formed by connecting curved lines, or a three-dimensional object by rotating a curved line around an arbitrary axis. Note that in this system, basic three-dimensional data on a rectangular parallelepiped, a sphere, a column, a cone and so on is prepared in advance. A complicated three-dimensional object shape can be formed by processing the basic three-dimensional data, combining the data or performing a logical operation between three-dimensional objects. In this manner, a three-dimensional coordinate data is generated.

<Step S202>

The operator manipulates the animation unit 102 to generate animation data. More specifically, the motion of the three-dimensional object or change of the shape of object corresponding to the passage of time are given to obtain animation data. A key-frame method where several scenes as a key to motions are made and the intervals between the key scenes are interpolated is employed. In the respective scenes, the position and direction of the object, the type and position of light source, the position and direction of a camera viewing the object are set. The animation setting unit 102 interpolates the setting by one frame and generates animation data.

<Step S203>

The operator manipulates the mapping attribute setting unit 103 to set necessary mapping attributes. The operator picks up one scene of the animation data, and performs selection of texture image to be mapped on the object, designation of a portion of texture image to be cut out, designation of a portion of object where the cut-out texture is mapped, designation of enlargement/reduction ratio, designation of transparency, designation of color conversion, designation of reflectivity on object surface, designation of granularity degree, designation of mapping method (surface mapping, spherical mapping, environmental mapping etc.).

As described above, mapping is made such that the respective set values are stored in a file as variables or inputted from a keyboard, then after precise mapping calculation such as mapping by the second mapping unit 105, the result from the mapping is displayed on a monitor for confirmation. This cannot be made in a real-time manner, therefore long time trial-and-error operation is required due to the lower-operability.

In the fifth embodiment, upon this operation, the first mapping unit 104 operates for real-time mapping. This is the most characteristic feature of the fifth embodiment. The operator can retry selection of a texture image to be mapped on the object many times. Further, the operator can moves the texture image on the object, searching for an appropriate mapping position, change the image enlargement/reduction ratio or the image transparency, and performs color conversion while watching the image display unit 107 as the monitor. These operations can be made in a real-time manner. This results in great improvement of the operability and reduces the trial-and-error time.

<Step S204>

If the result from step S203 is satisfactory, the process proceeds to step S205, and if not, returns to step S203.

<Step S205>

The operator selects an item "Mapping Test" from a menu displayed on a CRT and the like using a pointing device such as a mouse. Then, the first mapping unit 104 automatically performs mapping onto the animation data, and at the same time, displays the result on the image display unit 107. This is also a characteristic feature of the fifth embodiment. The operator can confirm the result by watching the mapped animation displayed on a monitor screen. Conventionally, a display test of mapped animation in a real-time manner has been impossible. To confirm the mapping result, results from mapping calculations with respect to all the scenes performed for many hours have been stored in files, and the stored results have been displayed on an image display unit for confirmation. Otherwise, the results have been recorded with a VTR by one frame, and the VTR is played for confirmation. These conventional methods require considerable amount of time. The mapping by the first mapping unit 104 has, not high, but a sufficiently high precision for testing.

<Step S206>

If the result from step S205 is satisfactory, the process proceeds to step S207, and if not, returns to step S203 for re-setting the mapping attributes.

<Step S207>

The operator selects an item "Execute Mapping" from the menu using a pointing device such as a mouse. Then, the second mapping unit 105 automatically performs mapping on the animation data, generates an image file by one frame and stores the files in the image storage unit 108. In CG animation according to the NTSC standards, the number of frames to be displayed for one second is thirty. Accordingly, if animation for five seconds is to be made, the number of requires frames is: 30 frames×5 sec.=150 frames. Thus, CG animation is completed through the above procedure.

Note that the first mapping unit 104 may be employed in the system as a software module. Otherwise, the first mapping unit 104 may be an LSI as a hardware in the system.

In the fifth embodiment, the selection of a menu is made by using a pointing device such as a mouse, however, a tablet and an input pen may be employed for the same purpose.

As described above, according to the fifth embodiment, upon CG animation generation, the operator can easily performs mapping attribute setting and confirmation of mapped animation data. This results in great improvement of operability and reduces the time for making high-quality CG animation.

Further, arbitrarily adjusting the mapping attribute information can realize animation with greater change than animation made in the first to fourth embodiments.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   data input means for performing modeling by inputting three-dimensional shape data of a plurality of objects;
   image input means for inputting texture image data;
   command input means for inputting a user's instruction;
   viewpoint input means for inputting viewpoint conditions;

image processing means for performing two-dimensional image processing on the texture image data based on present texture animation state values of which objects are independent from each other;

image generating means for generating an image where the texture image data processed by said image processing means is texture-mapped on the object modeled by said data input means based on the three-dimensional shape data, the viewpoint conditions, and the processed texture image data; and image display means for displaying the image generated by said image generation means.

2. The apparatus according to claim 1, further comprises control means for repeatedly performing image generation by said image generating means and image display by said image display means, to realize computer graphic animation.

3. The apparatus according to claim 2, wherein the texture animation state values are variable during computer graphic animation by said control means.

4. The apparatus according to claim 1, wherein the texture animation state values are independently provided with respect to each of plurality of objects in three-dimensional space.

5. An image processing method comprising:

a data input step of performing modeling by inputting three-dimensional shape data of a plurality of objects;

an image input step of inputting texture image data;

a command input step of inputting user's instructions;

a viewpoint input step of inputting viewpoint conditions;

an image processing step of performing two-dimensional image processing on the texture image data based on present texture animation state values of which objects are independent from each other;

an image generating step of generating an image where the texture image data, processed in said image processing step, is mapped on the object modeled in said data input step; and an image display step of displaying the image generated in said image generating step.

6. The method according to claim 5, further comprises a control step of repeatedly performing image generation in said image generating step and image display in said image display step, to realize computer graphic animation.

7. The method according to claim 6, wherein the texture animation state values are variable during computer graphic animation by said control means.

8. The method according to claim 5, wherein the texture animation state values are provided with respect to each of plurality of objects in three-dimensional space.

9. An image processing apparatus comprising:

data input means for performing modeling by inputting three-dimensional shape data of a plurality of objects;

image input means for inputting a plurality of texture image data;

image storing means for storing image data inputted by said image input means;

viewpoint input means for inputting viewpoint conditions;

state value storing means for storing texture animation state values;

state value change means for changing the texture animation state values;

image processing means for performing image processing on the texture image data stored in said image storing means based on the texture animation state values of which objects are independent from each other;

image generating means for generating an image where the texture image data, processed by said image processing means, is mapped on the object modeled by said data input means based on the three-dimensional shape data, the viewpoint conditions, and the processed texture image data; and image display means for displaying the image generated by said image generating means.

10. The apparatus according to claim 9, wherein plurality of images generated by said image generating means are continuously displayed by said image display means, to realize computer graphic animation.

11. The apparatus according to claim 9, wherein the texture animation state values include texture identifiers, texture animation identifiers and texture animation variables, and wherein said state value storing means is independently provided for each of plurality of objects.

12. The apparatus according to claim 9, wherein said state value change means change the texture animation state values in the process of generating a plurality of images forming the computer graphic animation.

13. The apparatus according to claim 9, wherein said image processing means performs image processing using the texture animation state values in said state value storing means.

14. A modeling apparatus for performing modeling of an object, comprising:

designation means for, in three-dimensional space, designating a position;

first generating means for generating three-dimensional coordinates in accordance with the position designated by said designation means;

additional information providing means for providing additional information based on the three-dimensional coordinates generated by said first generating means;

second generating means for generating three-dimensional data for displaying based on the three-dimensional coordinates generated by said first generating means and the additional information provided by said additional information providing means; and display means for displaying the three-dimensional data generated by said second generating means.

15. The apparatus according to claim 14, wherein said designation means comprises a glove and first detection means for, in three-dimensional space, detecting a position of said glove, said designation means further comprising second detection means for detecting a finger bend degree of said glove.

16. The apparatus according to claim 14, wherein the additional information is moving information, rotation information, enlargement/reduction information or deformation information.

17. A modeling method for performing modeling of an object, comprising:

a designation step of, in three-dimension space, designating a position;

a first generating step of generating three-dimensional coordinates in accordance with the position designated in said designation step;

an additional information providing step of providing additional information based on the three-dimensional coordinates generated in said first generating step;

a second generating step of generating three-dimensional data for displaying based on the three-dimensional coordinates generated in said first generating step and the additional information provided in said additional information providing step; and a display step of displaying the three-dimensional data based on the three dimensional data generated in said second generating step.

18. The method according to claim 17, wherein said designation step is performed by detecting a position of a glove and a finger bend degree of the glove.

19. The method according to claim 17, wherein the additional information is moving information, rotation information, enlargement/reduction information or deformation information.

20. An image processing apparatus comprising:

three-dimensional modeling means for inputting, using a three-dimensional coordinate input means, a three-dimensional shape to obtain an object;

animation means for providing motion to the object obtained by said three-dimensional modeling means;

mapping attribute setting means for setting various attribute information necessary for performing mapping on the object obtained by said animation means;

first mapping means for performing mapping in accordance with the attribute information set by said mapping attribute setting means upon the object obtained by said animation means at a predetermined precision;

second mapping means for performing mapping in accordance with the attribute information set by said mapping attribute setting means upon the object obtained by said animation means at a precision higher than the predetermined precision;

display means for displaying animation of the object mapped by said first mapping means;

selection means for, after display operation by said display means, selecting to adjust or not to adjust the attribute information by said mapping attribute setting means;

control means for, if said selection means selects not to adjust the attribute information by said mapping attribute setting means, activating said second mapping means based on current attribute information; and memory means for sequentially storing animation data generated under the control of said control means into a predetermined storage medium.

21. The apparatus according to claim 20, wherein said first mapping means performs the mapping at calculation precision lower than that of the mapping by said second mapping means.

22. The apparatus according to claim 20, wherein said first mapping means performs the mapping by changing the size of the object to a predetermined size.

23. An image processing method comprising:

a three-dimensional modeling step of inputting, using a three-dimensional coordinate input means, a three-dimensional shape to obtain an object;

an animation step of providing motion to the object obtained in said three-dimensional modeling step;

a mapping attribute setting step of setting various attribute information necessary for performing mapping on the object obtained in said animation step;

a first mapping step of performing mapping in accordance with the attribute information set in said mapping attribute setting step upon the object obtained in said animation step at a predetermined precision;

a second mapping step of performing mapping in accordance with the attribute information set in said mapping attribute setting step upon the object obtained in said animation step at a precision higher than the predetermined precision;

a display step of displaying animation of the object mapped in said first mapping step;

a selection step of, after display operation in said display step, selecting to adjust or not to adjust the attribute information set in said mapping attribute setting step;

a control step of, if it is selected in said selection step not to adjust the attribute information set in said mapping attribute setting step, performing mapping in said second mapping step based on current attribute information; and a memory step of sequentially storing animation data generated under the control in said control step into a predetermined storage medium.

24. The method according to claim 23, wherein in said first mapping step, the mapping is performed at calculation precision lower than that of the mapping in said second mapping step.

25. The method according to claim 23, wherein in said first mapping step, the mapping is performed by changing the size of the object to a predetermined size.

* * * * *

UNITED STATES PATENT AND TRADEMARK OFFICE
CERTIFICATE OF CORRECTION

PATENT NO. : 5,687,307

DATED : November 11, 1997

INVENTORS : HIROKAZU AKISADA ET AL.

It is certified that error appears in the above-identified patent and that said Letters Patent is hereby corrected as shown below:

ON TITLE PAGE, item

[56] References Cited  Insert --5,226,109  7/1993 Dawson et al. 4,645,459  2/1987 Graf et al.--.

COLUMN 2 line 50, ""has" should read --has--; and
  line 51, "provided"" should read --provided--.

COLUMN 3 line 51, "mapping:" should read --mapping;--.

COLUMN 6 line 17, "the" should be deleted; and
  line 26, "of" should read --of an--.

COLUMN 8 line 21, "Operating System" should read --Operating System (OS)--.

UNITED STATES PATENT AND TRADEMARK OFFICE
CERTIFICATE OF CORRECTION

PATENT NO. : 5,687,307

DATED : November 11, 1997

INVENTORS : HIROKAZU AKISADA ET AL.

It is certified that error appears in the above-identified patent and that said Letters Patent is hereby corrected as shown below:

COLUMN 11 line 1, "vertexesconstructing" should read --vertexes constructing--; and
line 51, "stores" should read --stores the--.

COLUMN 12 line 2, "set" should read --sets--;
line 29, "DG←1" should read --DG← -1--; and
line 31, "DB←1" should read --DB← -1--.

COLUMN 13 line 66, "into" should read --in--.

COLUMN 14 line 6, "color" should read --the color--.

COLUMN 16 line 11, "DG→-1" should read --DG→ -1--; and
line 15, "DB→-1" should read --DB→ -1--.

UNITED STATES PATENT AND TRADEMARK OFFICE
CERTIFICATE OF CORRECTION

PATENT NO.   : 5,687,307
DATED        : November 11, 1997
INVENTORS    : HIROKAZU AKISADA ET AL.

Page 3 of 4

It is certified that error appears in the above-identified patent and that said Letters Patent is hereby corrected as shown below:

COLUMN 17 line 25,  "$\alpha \leftarrow \alpha D\alpha$" should read --$\alpha \leftarrow \alpha + D\alpha$--; and
line 33,  "A1U 6" should read --ALU 6--.

COLUMN 18 line 17,  "color" should read --the color--; and
line 65,  "his" should read --this--.

COLUMN 20 line 33,  "$(\beta\gamma\theta)$." should read --$(\beta, \gamma, \theta)$.--; and
line 44,  "performed" should read --performed by --.

COLUMN 22 line 29,  "step," should read --steps,--; and
line 50,  "calculates" should read --calculate--.

COLUMN 26 line 29,  "obtains" should read --obtain--;
line 50,  "liner" should read --linear--;
line 57,  "liner" should read --linear--; and

UNITED STATES PATENT AND TRADEMARK OFFICE
CERTIFICATE OF CORRECTION

PATENT NO. : 5,687,307

DATED : November 11, 1997

INVENTORS : HIROKAZU AKISADA ET AL.

It is certified that error appears in the above-identified patent and that said Letters Patent is hereby corrected as shown below:

COLUMN 26 line 61,    "liner" should read --linear--.

COLUMN 27 line 22,    "of" (second occurrence) should read --of the-- line 56,    "moves" should read --move--; and line 59,    "performs" should read --perform--.

COLUMN 28 line 42,    "performs" should read --perform--.

Signed and Sealed this

Second Day of June, 1998

Attest:

BRUCE LEHMAN

*Attesting Officer*    *Commissioner of Patents and Trademarks*